(12) United States Patent
Kawakami

(10) Patent No.: US 6,862,054 B2
(45) Date of Patent: Mar. 1, 2005

(54) ELECTRO-OPTICAL DEVICE AND ELECTRONIC APPARATUS HAVING A SUBSTRATE THAT FUNCTIONS AS A LIGHT GUIDE PLATE

(75) Inventor: Hisanori Kawakami, Matsumoto (JP)

(73) Assignee: Seiko Epson Corporation (JP)

( * ) Notice: Subject to any disclaimer, the term of this patent is extended or adjusted under 35 U.S.C. 154(b) by 31 days.

(21) Appl. No.: 10/379,432

(22) Filed: Mar. 4, 2003

(65) Prior Publication Data

US 2003/0218701 A1 Nov. 27, 2003

(30) Foreign Application Priority Data

Mar. 6, 2002 (JP) ........................................ 2002-060714
Jan. 20, 2003 (JP) ........................................ 2003-011230

(51) Int. Cl.[7] ........................... G02F 1/1335; F21V 7/04
(52) U.S. Cl. .............................. 349/65; 349/62; 349/96; 349/98; 349/113; 362/31
(58) Field of Search .............................. 349/60–65, 96, 349/98, 113; 362/31

(56) References Cited

U.S. PATENT DOCUMENTS

| 6,108,059 | A | * | 8/2000 | Yang | 349/65 |
| 6,340,999 | B1 | * | 1/2002 | Masuda et al. | 349/63 |
| 6,364,497 | B1 | * | 4/2002 | Park et al. | 362/31 |
| 6,642,976 | B2 | * | 11/2003 | Umemoto et al. | 349/65 |
| 6,693,690 | B2 | * | 2/2004 | Umemoto et al. | 349/113 |
| 6,717,635 | B2 | * | 4/2004 | Taniguchi et al. | 349/65 |
| 6,742,921 | B2 | * | 6/2004 | Umemoto et al. | 362/561 |
| 6,744,480 | B2 | * | 6/2004 | Kaneko | 349/65 |
| 2003/0076465 | A1 | * | 4/2003 | Shimoda et al. | 349/113 |
| 2004/0109097 | A1 | * | 6/2004 | Mai | 349/12 |

FOREIGN PATENT DOCUMENTS

| JP | 06-095111 | 4/1994 |
| JP | 09-090359 | 4/1997 |
| JP | 10-186361 | 7/1998 |
| JP | 2001-272512 | 5/2001 |
| JP | 2001-166296 | 6/2001 |
| JP | 2002-133907 | 5/2002 |

* cited by examiner

Primary Examiner—Tarifur R. Chowdhury
(74) Attorney, Agent, or Firm—Harness, Dickey & Pierce, P.L.C.

(57) ABSTRACT

A liquid crystal device 1 has light sources 22 such as LED's disposed so as to face a side surface of a substrate 7b, and also has a light guiding film 4 and a light-source reflective layer 41 disposed so as to face the outer surface of the substrate 7b, in that order, whereby light can be supplied into a liquid crystal panel 2 without a thick light guiding plate. The light guiding film has a plurality of slanted surfaces 4c for reflecting light from the light sources 22 to the substrate 7b.

17 Claims, 15 Drawing Sheets display light

FIG. 5
(a)
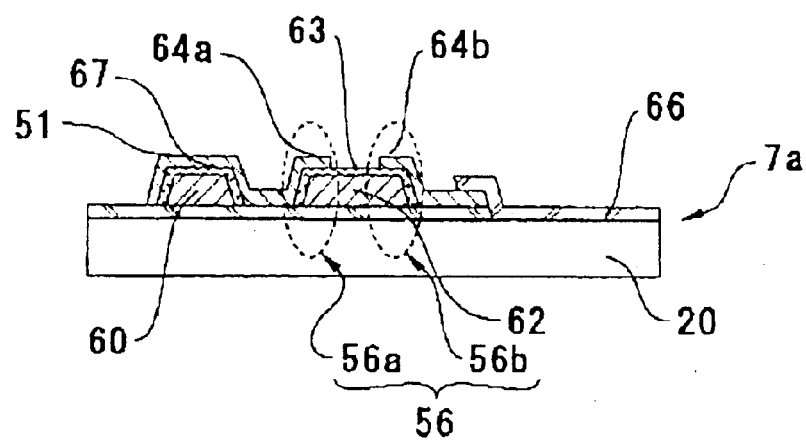
(b)
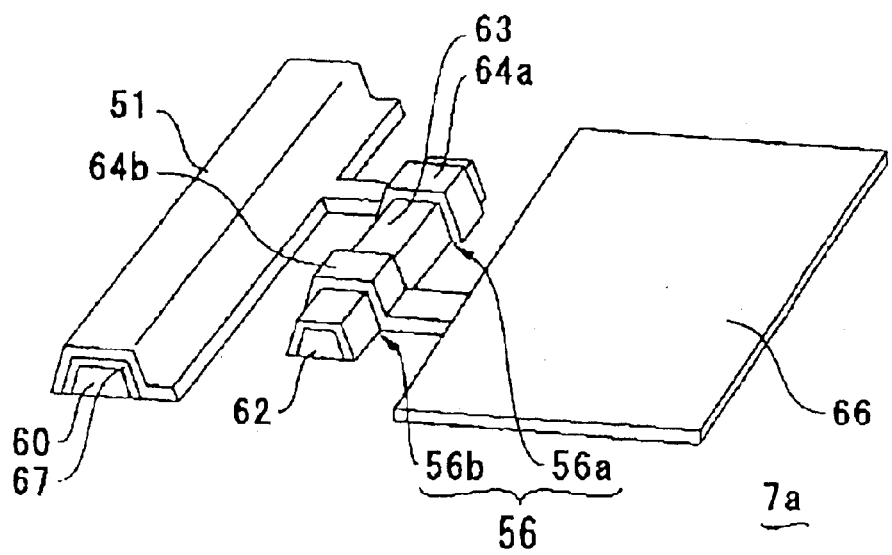

FIG. 6
(a)
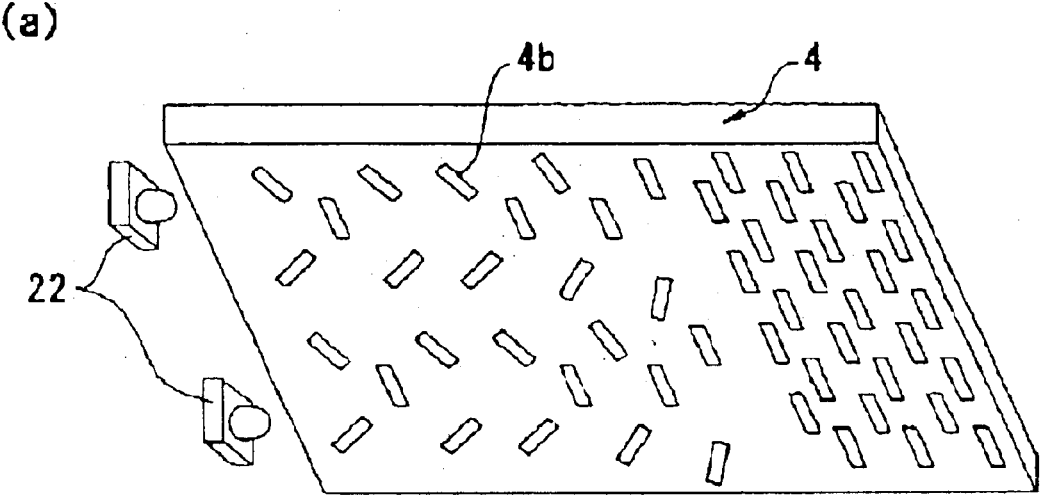
(b)
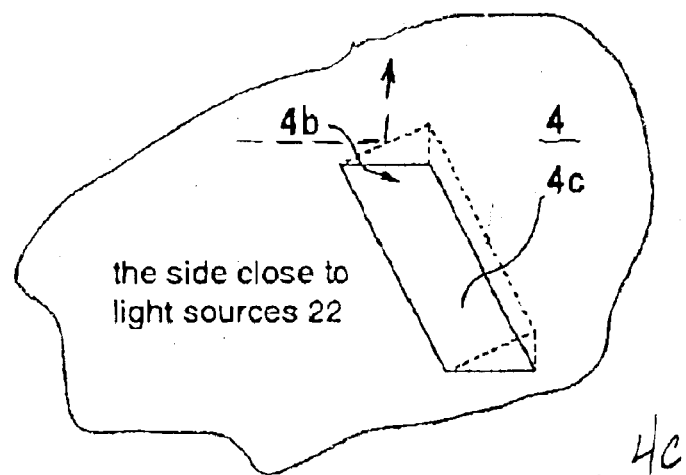
(c)
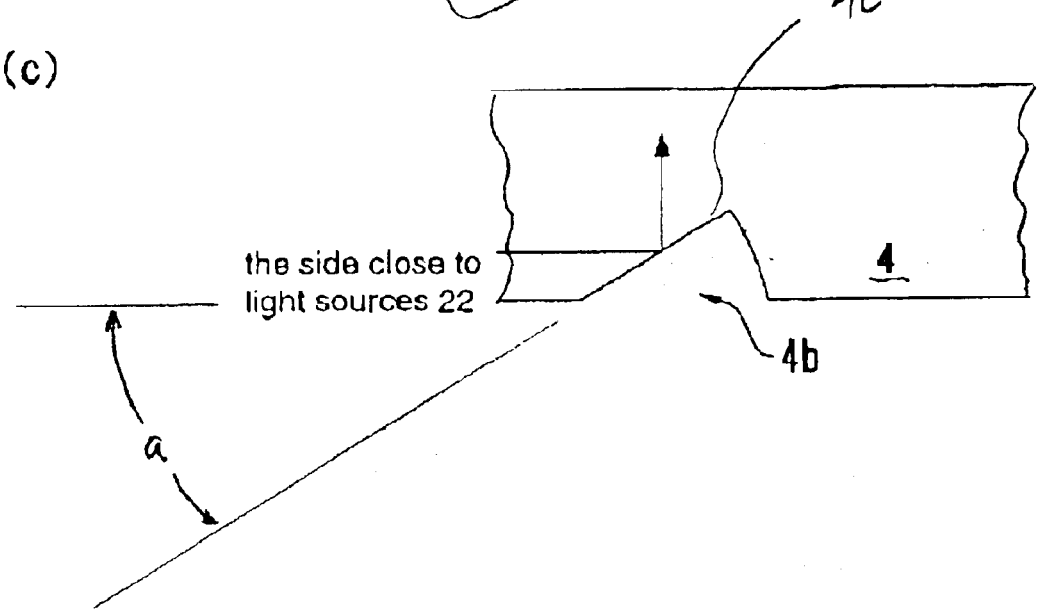

FIG. 7
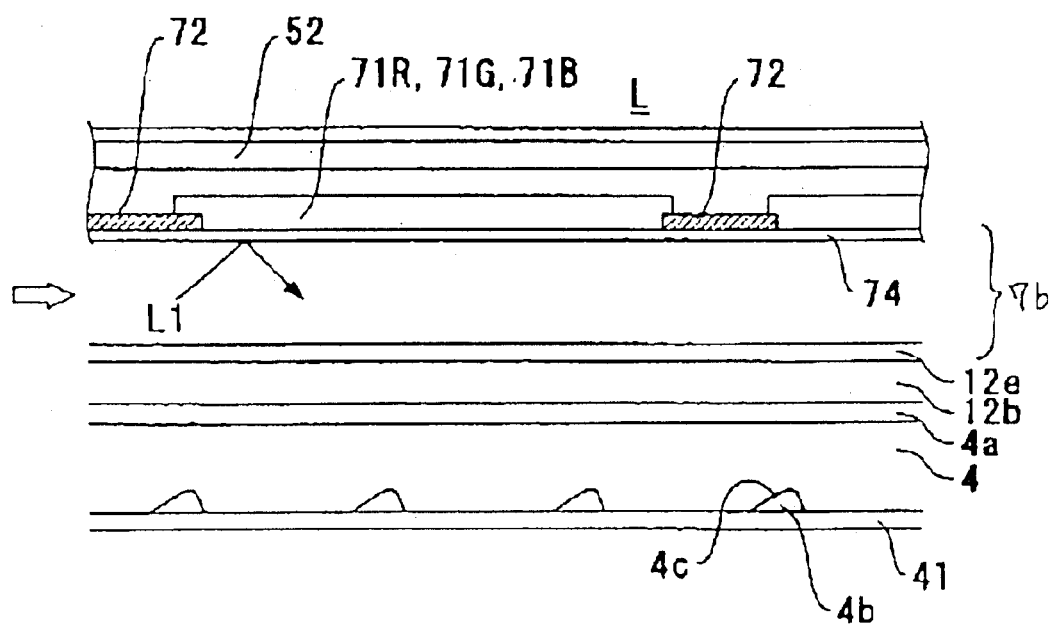
(a)
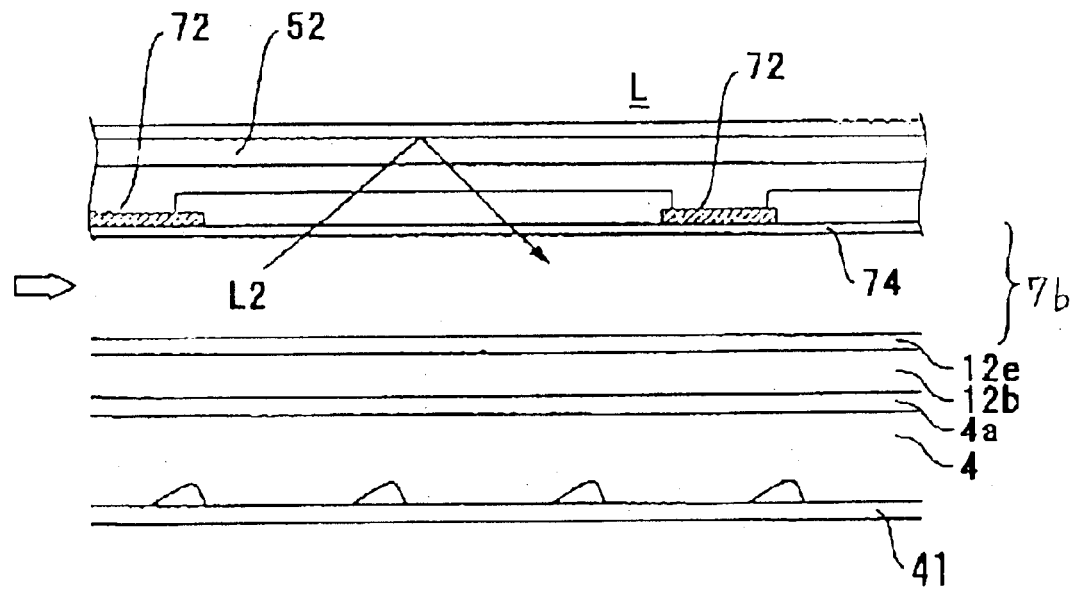
(b)

FIG. 8
(a)
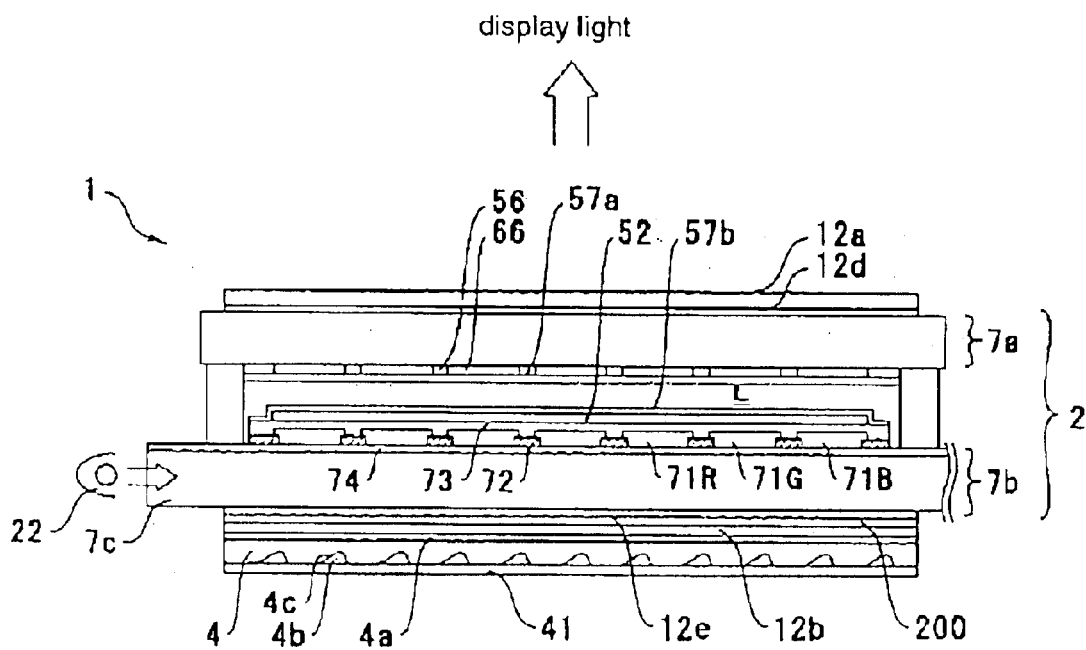
(b)
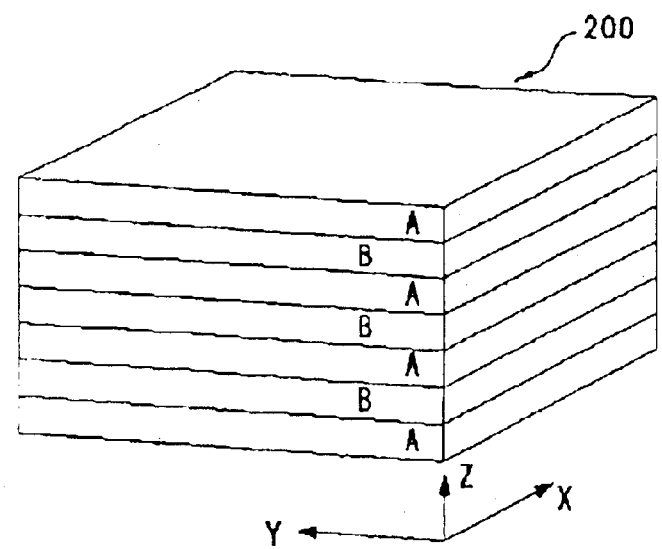

display light ↑ display light ↑

FIG. 15
(a)
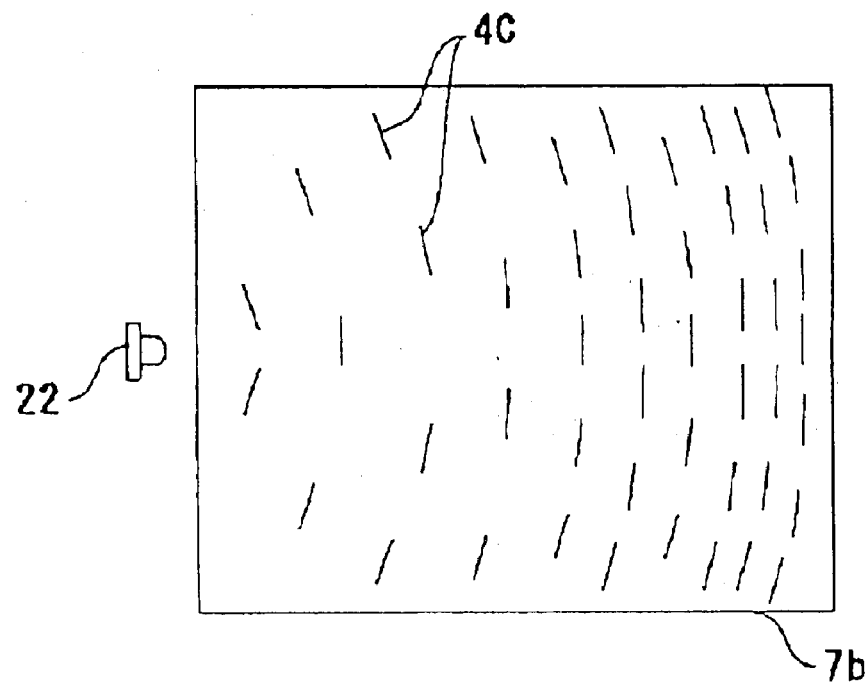
(b)
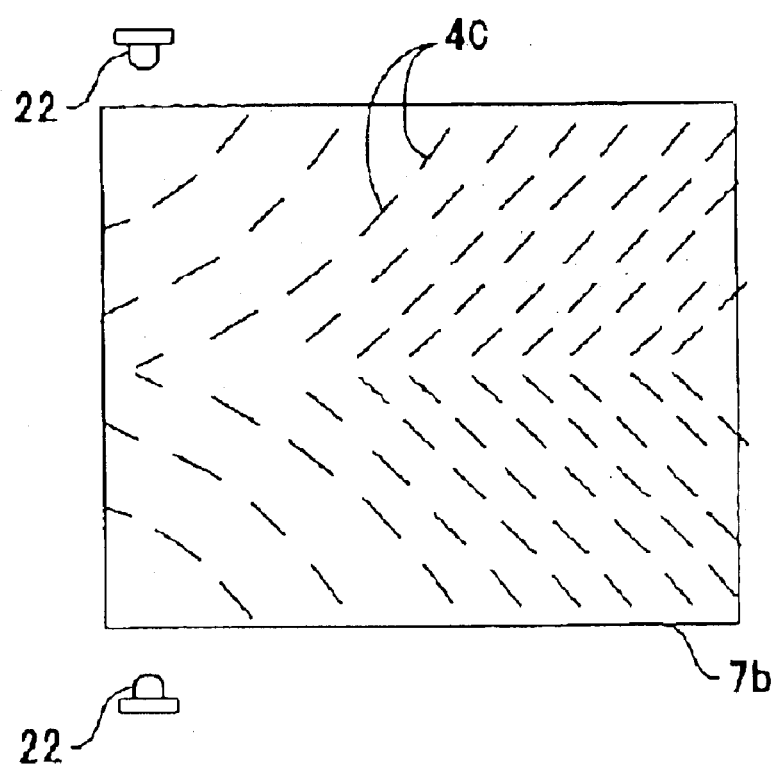

FIG. 17
(a)
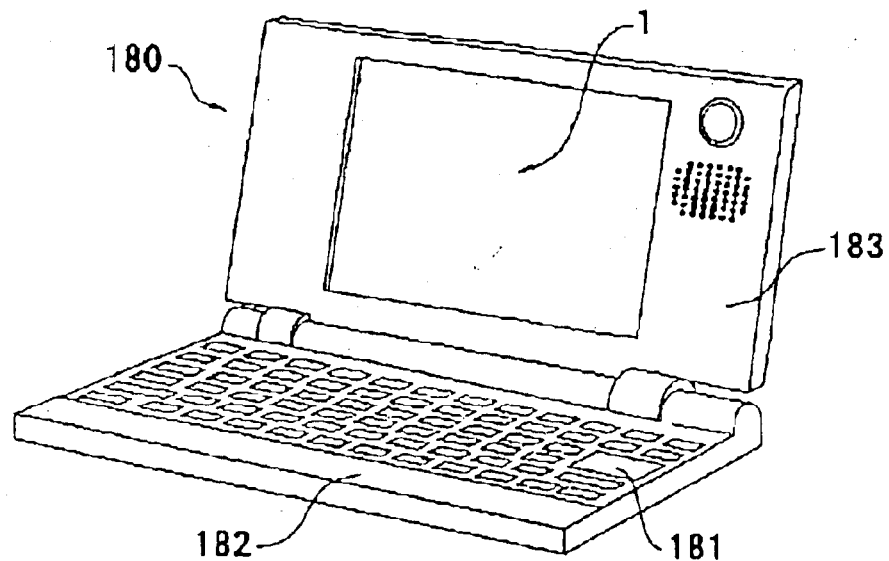
(b)
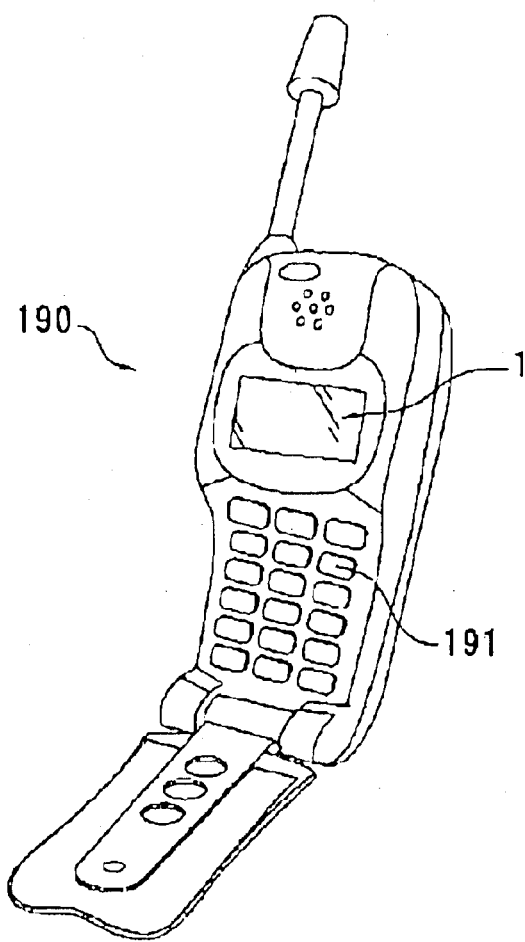

Prior Art

US 6,862,054 B2

ELECTRO-OPTICAL DEVICE AND ELECTRONIC APPARATUS HAVING A SUBSTRATE THAT FUNCTIONS AS A LIGHT GUIDE PLATE

FIELD OF THE INVENTION

The present invention relates to an electro-optical device, which displays an image by using light emitted from a light source, and to an electronic apparatus using the same. More specifically, the present invention relates to a technology about an illumination system of the electro-optical device.

DESCRIPTION OF THE RELATED ART

In recent years, electro-optical devices such as liquid crystal devices have been widely used as display units of electronic apparatuses such as a portable phone, a mobile computer, and a video camera. The liquid crystal device has liquid crystal as an electro-optical material held between a pair of substrates having electrodes and displays an image by driving the liquid crystal between the electrodes.

In accordance with light supplying methods and display modes, the above-mentioned liquid crystal devices are classified as follows. One is a reflective liquid crystal device in which, at a reflective film disposed outside the outer surface or on the inner surface of one substrate, external light incident on and emitted from another substrate is reflected back to the other substrate so as to perform display. Another is a transmissive display device in which light is two-dimensionally supplied into the liquid crystal by an illumination device disposed outside the outer surface of the one substrate and the light is emitted from the other substrate so as to display an image; and still another is a transflective display device which functions as a reflective type when external light is sufficient and as a transmissive type when it is insufficient (for example, see Japanese Unexamined Patent Application Publication No. 2002-133907 (Page 6, FIG. 1)).

As shown in FIG. 18, the conventional illumination device for use in the transmissive liquid crystal device or the transflective liquid crystal device has a backlight device 31a disposed so as to face the outer surface of, for example, a counter substrate 7b, of an element substrate 7a and the counter substrate 7b holding a liquid crystal layer L therebetween. The backlight device 31a has a light guiding plate 4' and a light source 21 for emitting light towards the side surface of the light guiding plate 4'. The light guiding plate 4' has a light diffusing sheet 27 bonded on one surface thereof facing the counter substrate 7b and a reflective sheet 28 bonded on the other surface thereof. With this structure, light emitted from the light source 21 is incident on the light guiding plate 4' via a side surface 49 thereof; travels therein along its surface; is reflected at the reflective sheet 28; and is incident on the liquid crystal layer L via the counter substrate 7b.

Although it is strongly desired to reduce the size and the thickness of an electro-optical device such as a liquid crystal device, especially used in a compact electronic apparatus such as a portable phone, a mobile computer, or a video camera, since the light guiding plate 4' for the backlight unit 31a used in the known liquid crystal device is thick, it is difficult to achieve a thin liquid crystal device.

In view of the above problem, an object of the present invention is to provide an electro-optical device, having a thin structure achieved by improving the structure of its illumination system, and an electronic apparatus using the same.

SUMMARY OF THE INVENTION

To solve the above-mentioned problems, an electro-optical device according to the present invention comprises a pair of substrates holding an electro-optical material therebetween; at least one light source emitting light to a side surface of one substrate of the pair of substrates; and a light guiding film which is disposed so as to face one surface of the one substrate, lying opposite to another surface of thereof holding the electro-optical material, directly or having at least one other optical member interposed therebetween, and which has a plurality of light-deflecting slanted surfaces for guiding light traveling in the light guiding film along its surface towards the one substrate.

In the electro-optical device according to the present invention, of the pair of substrates holding the electro-optical material, light emitted from the light sources is incident on the one substrate and travels therein along its surface. On this occasion, of the two surfaces of the one substrate, the light emitted from the other surface of the one substrate holding the electro-optical material is incident on the electro-optical material layer so as to contribute to performing display. On the other hand, the light emitted from the one surface of the one substrate lying opposite to the other surface holding the electro-optical material is incident on the light guiding film directly or via a polarizer and travels in the light guiding film along its surface. On this occasion, upon encountering one of the light-deflecting slanted surfaces formed in the light guiding film, the light is deflected; is emitted towards the one substrate; and is incident on the electro-optical material layer so as to contribute to performing display. As described above, according to the present invention, one of the pair of substrates holding the electro-optical material plays part of the roles of a conventional light guiding plate, whereby the thick light guiding plate can be eliminated, leading to a thin structure of the electro-optical device.

In the electro-optical device according to the present invention, when the one substrate holding the electro-optical material is intended to function as a light guiding plate for a backlight device, the light guiding film preferably has a light-source reflective layer disposed on one surface thereof lying opposite to the other surface thereof close to the one substrate. In this case, the one substrate of the pair of substrates lies, for example, opposite to the other substrate from which display light is emitted.

In the electro-optical device having the above-described structure, it is preferable that the one substrate and the light guiding film have a polarizer disposed therebetween, and that the polarizer and the one substrate have a reflective polarizer disposed therebetween, both polarizers serving as said other optical member. Of P-polarized light and S-polarized light, for example, while the polarizer transmits the P-polarized light and absorbs the S-polarized light, the reflective polarizer transmits the P-polarized light towards the polarizer and reflects the S-polarized light to the one substrate. With this arrangement, the S-polarized light component which would be absorbed by the polarizer can be recycled and can be used as display light. As a result, since the light utilization efficiency improves, the luminance of the liquid crystal device improves. Also, this structure reduces the difference between the luminance of the liquid crystal display 1 at the light entrance side thereof and that at the other side thereof, which occurs because the incident light traveling in the one substrate is absorbed by the polarizer.

Also, in the electro-optical device according to the present invention, the one substrate preferably has an inner polarizer layer formed on the other surface thereof holding the electro-optical material. With this structure, the number of optical components can be reduced.

The electro-optical device according to the present invention may have a structure in which the one substrate has a first inner polarizer layer, a light reflective layer for reflective display which partially transmits light, and a second inner polarizer layer, formed on the other surface thereof holding the electro-optical material, in that order.

The electro-optical device according to the present invention may have a structure in which the one substrate has an inner reflective polarizer layer, a first inner polarizer layer, a light reflective layer for reflective display which partially transmits light, and a second inner polarizer layer, formed on the other surface thereof holding the electro-optical material, in that order.

The electro-optical device according to the present invention may have a structure in which the one substrate has an inner polarizer layer and an inner reflective polarizer layer, formed of a wire-grid layer, formed on the other surface thereof holding the electro-optical material, in that order.

In the electro-optical device according to the present invention, the one substrate of the pair of substrates may be the substrate from which display light is emitted. With this arrangement, the one substrate holding the electro-optical material serves as a light guiding plate for a front light device.

In the electro-optical device according to the present invention, the light source emits light, for example, onto a side surface of the one substrate.

In the electro-optical device according to the present invention, the light-deflecting slanted surfaces are formed in corresponding fine depressions or on corresponding projections formed in the light guiding film.

In the electro-optical device according to the present invention, the light guiding film is preferably fixed to the one substrate directly or having at least one optical member interposed therebetween by using an adhesive agent. Although, depending on the kind of electro-optical material, the light guiding film may be fixedly bonded to the substrate holding the electro-optical material directly, in the electro-optical device utilizing the polarizing nature of light, since one of the surfaces of the polarizer is in general fixedly bonded to the substrate holding the electro-optical material, the light guiding film is fixedly bonded to the other surface of the polarizer.

In the electro-optical device according to the present invention, the light source is a point light source such as an LED (light emitting diode). In this case, it is preferable that the plurality of light-deflecting slanted surfaces be concentrically distributed so as to have their center at the light source. With this configuration, light incident on an electro-optical material layer is uniformly distributed over the surface thereof, whereby a high-quality image can be displayed.

In the electro-optical device according to the present invention, it is preferable that the plurality of light-deflecting slanted surfaces lying far away from the light source be more densely formed than those lying close to the light source. With this configuration, light incident on the electro-optical material layer is uniformly distributed over the surface thereof, whereby a high-quality image can be displayed.

In the electro-optical device according to the present invention, the one substrate may have a light absorbing layer on the other surface thereof lying close to the electro-optical material, and in this case, under the light absorbing layer, the one substrate preferably has a low refractive index layer formed selectively over the surface thereof or substantially over the entire surface thereof. The light absorbing layer mentioned here is, for example, a light shielding film or a color filter layer. When the one substrate serving as the light guiding plate has the light absorbing layer, since part of the light incident on the one substrate is absorbed by the light absorbing layer, light loss occurs; however, when the low refractive index layer is formed under the light absorbing layer, since the light travels in the one substrate while being reflected at the interface between the one substrate and the low refractive index layer, the light is prevented from being absorbed by the light absorbing layer. Accordingly, the transmission efficiency of light traveling in the substrate can be improved.

In the electro-optical device according to the present invention, the electro-optical material is liquid-crystal, for example.

The electro-optical device according to the present invention can be used as a display unit of an electronic apparatus such as a portable phone or a mobile computer.

BRIEF DESCRIPTION OF THE DRAWINGS

FIGS. 5(*a*) and 5(*b*) are a sectional view taken along the line C–C' indicated in FIG. 4 and a perspective view of one pixel and the corresponding terminal(s), respectively.

FIGS. 6(*a*), 6(*b*), and 6(*c*) are illustrations of a light guiding film for use in the liquid crystal device shown in FIG. 2, viewed from the bottom thereof in FIGS. 6(*a*–*b*) and in section in FIG. 6(*c*), showing a fine depression formed in the light guiding film, and a light-deflecting slanted surface formed in this depression.

FIGS. 7(*a*) and 7(*b*) are illustrations of a low refractive index layer formed on a counter substrate of the liquid crystal device shown in FIG. 2 and advantages of this low refractive index layer, respectively.

FIGS. 8(*a*) and 8(*b*) are illustrations of a liquid crystal device according to a second embodiment of the present invention and a reflective polarizer for use in this liquid crystal device, respectively.

FIGS. 15(a) and 15(b) are illustrations of other embodiments of the present invention, respectively.

FIGS. 17(a) and 17(b) are illustrations of a mobile personal computer and a potable phone as examples of an electronic apparatus using the liquid crystal device according to the present invention, respectively.

DESCRIPTION OF THE PREFERRED EMBODIMENTS

Embodiments of the present invention will be described with reference to the accompanying drawings.

First Embodiment
Overall Structure of Liquid Crystal Device

Figure 1:
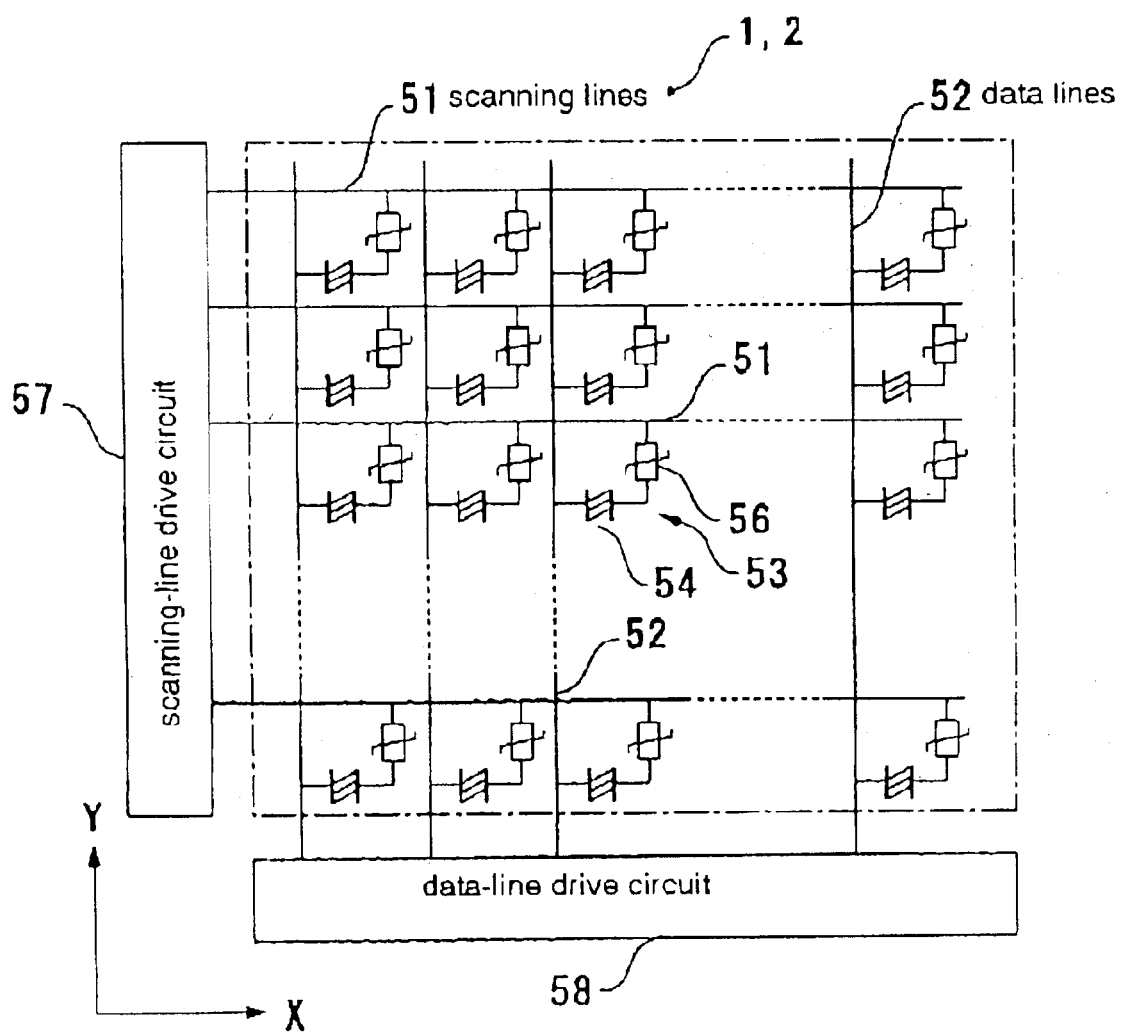
FIG. 1 is a schematic illustration of the electrical structure of a liquid crystal device.
Figure 2:
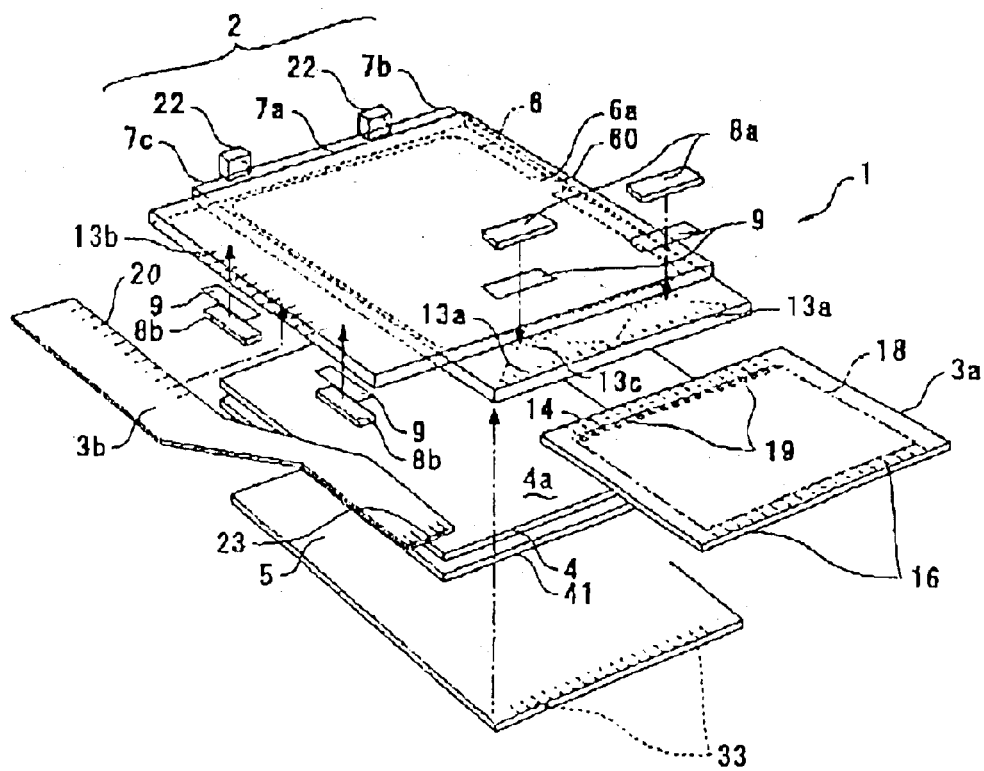
FIG. 2 is an exploded perspective view of an example liquid crystal device according to a first embodiment according to the present invention.
Figure 3:
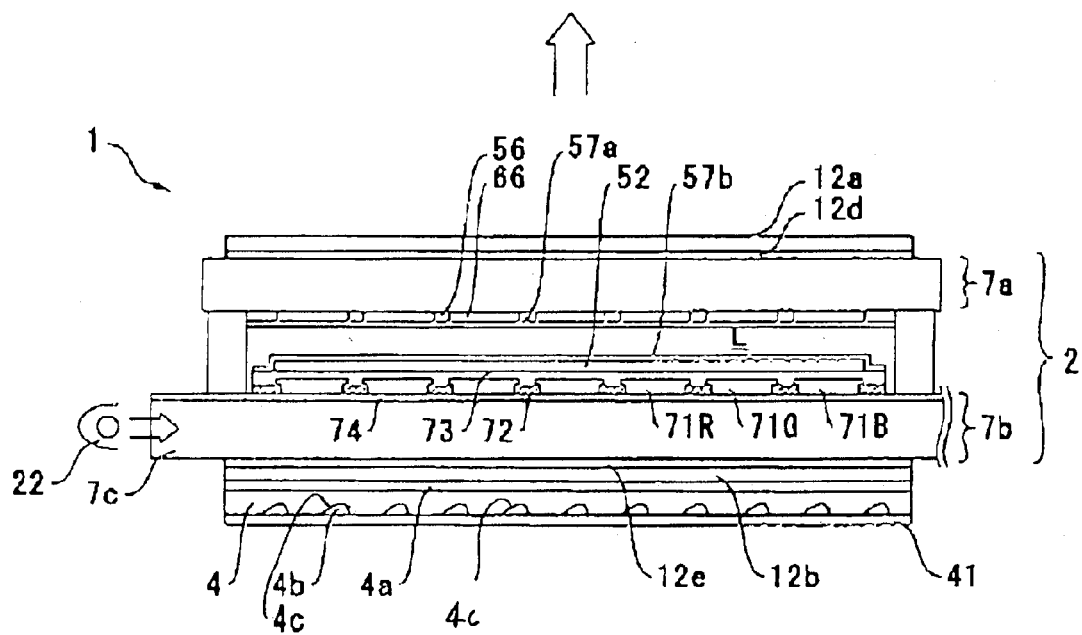
FIG. 3 is a sectional view of the liquid crystal device shown in FIG. 2.

FIG. 1 is a schematic illustration of the electrical structure of a liquid crystal device. FIGS. 2 and 3 are an exploded perspective view of the liquid crystal device according to a first embodiment of the present invention and a sectional view of the same, respectively. A polarizer is not shown in FIG. 2.

As shown in FIG. 1, in a liquid crystal panel 2 for use in a liquid crystal device 1 (an electro-optical device) to which the present invention is applied, a plurality of scanning lines 51 are formed as wiring lines along the row direction (X-direction) and a plurality of data lines 52 are formed along the column direction (Y-direction). Each pixel 53 is formed at a point corresponding to each of the intersections between the scanning lines 51 and the data lines 52, and a liquid crystal layer 54 (layer of electro-optical material) and a TFD element 56 for performing pixel-switching are connected in series at each pixel 53. Each of the scanning lines 51 is driven by a corresponding scanning-line drive circuit 57 and each of the data lines 52 is driven by a corresponding data-line drive circuit 58. In this embodiment, the scanning-line drive circuits 57 and the data-line drive circuits 58 are respectively formed in corresponding liquid-crystal drive ICs 8a and liquid-crystal drive ICs 8b, which will be described later with reference to FIG. 2.

As shown in FIG. 2, the liquid crystal device 1 has a structure in which, for example, the liquid crystal panel 2 has FPC (flexible printed circuit) boards 3a and 3b connected thereto, optical components disposed at the rear side thereof, which will be described later, and a control board 5 disposed behind these optical components.

In the liquid crystal panel 2, an element substrate 7a and a counter substrate 7b are bonded to each other by a sealant 6 applied to one of these substrates along the periphery thereof. Also, a discontinuous portion of the sealant 6 serves as a liquid crystal inlet 6a and the liquid crystal inlet 6a is blocked by a sealing compound 60.

With COG (chip on glass) mounting technology, the liquid-crystal drive ICs 8a are mounted, by using ACFs (anisotropic conductive films) 9, on the upper surface of an extended portion of the counter substrate 7b that extends from the element substrate 7a. Also, with COG mounting technology, the liquid-crystal drive ICs 8b are mounted, by using the other ACFs 9, on the lower surface of an extended portion of the element substrate 7a that extends from the counter substrate 7b.

As shown in FIG. 3, the element substrate 7a has a plurality of pixel electrodes 66 and the TFD elements 56, serving as active elements for performing pixel-switching, formed both on the inner surface thereof in a matrix array, and a polarizer 12a bonded to the outer surface thereof by having an adhesive agent 12d interposed therebetween.

The counter substrate 7b has the plurality of data lines 52 formed on the inner surface thereof in a stripe array and a polarizer 12b bonded to the outer surface thereof by having an adhesive agent 12e therebetween. With this configuration, the element substrate 7a and the counter substrate 7b have a gap (cell gap) therebetween, enclosed by the sealant 6, and a liquid crystal L is filled in the gap as an electro-optical material.

The element substrate 7a and the counter substrate 7b have a variety of optical elements disposed thereon as needed, in addition to the above-mentioned elements. For example, the element substrate 7a and the counter substrate 7b have alignment films 57a and 57b on the respective inner surfaces thereof for aligning the liquid crystal L. These alignment films 57a and 57b are formed, for example, by applying polyimide solvent onto the above-mentioned inner surfaces and then by baking it. Since the polymer main chains of this polyimide are drawn in a predetermined direction by rubbing, liquid crystal molecules in the liquid crystal L filled between the substrates are oriented in the drawing directions of the alignment films.

Also, in order to perform a color display, color filters 71R, 71G, and 71B for R (red), G (green), and B (blue) colors are formed in a predetermined array in regions above the counter substrate 7b that face the pixel electrodes 66, and a black matrix 72 is formed in the other regions that do not face the pixel electrodes 66. Furthermore, a planarizing layer 73 is coated on the color filters 71R, 71G, and 71B and the black matrix 72 in order to planarize and protect them, and the data lines 52, which are composed of an ITO film (transparent conductive film), are formed on the upper surface of this planarizing layer 73.

Referring back to FIG. 2, pluralities of terminals 13a and 13c are formed on the extended portion of the counter substrate 7b, and the FPC board 3a is connected to one ends of the terminals 13a, which ends lie close to the edge of the counter substrate, by using the ACFs or the like. The FPC board 3a has a wiring pattern 18 formed as needed on the upper surface thereof. The wiring pattern 18 is directly connected to control-board terminals 16 at one end thereof and is connected to panel terminals 14 at the other end thereof via through-holes 19. With COG mounting technology, the liquid-crystal drive ICs 8a are connected to the other ends of the plurality of terminals 13a and to the plurality of terminals 13c by using the ACFs 9, and the scanning lines 51 are thus electrically connected to the corresponding terminals 13c.

Also, the plurality of terminals 13b are formed on the extended portion of the element substrate 7a. A plurality of terminals 20 are formed at one end of the FPC board 3b and are electrically connected to the corresponding terminals 13b of the counter substrate 7b by using the ACFs or the like. In addition, a plurality of terminals 23 formed at the other end of the FPC board 3b are connected to corresponding terminals (not shown) of the control board 5. Furthermore, terminals 33 for connection to outer circuits are formed at one end of the control board 5.

Structure of TFD (Thin Film Diode)

Figure 4:
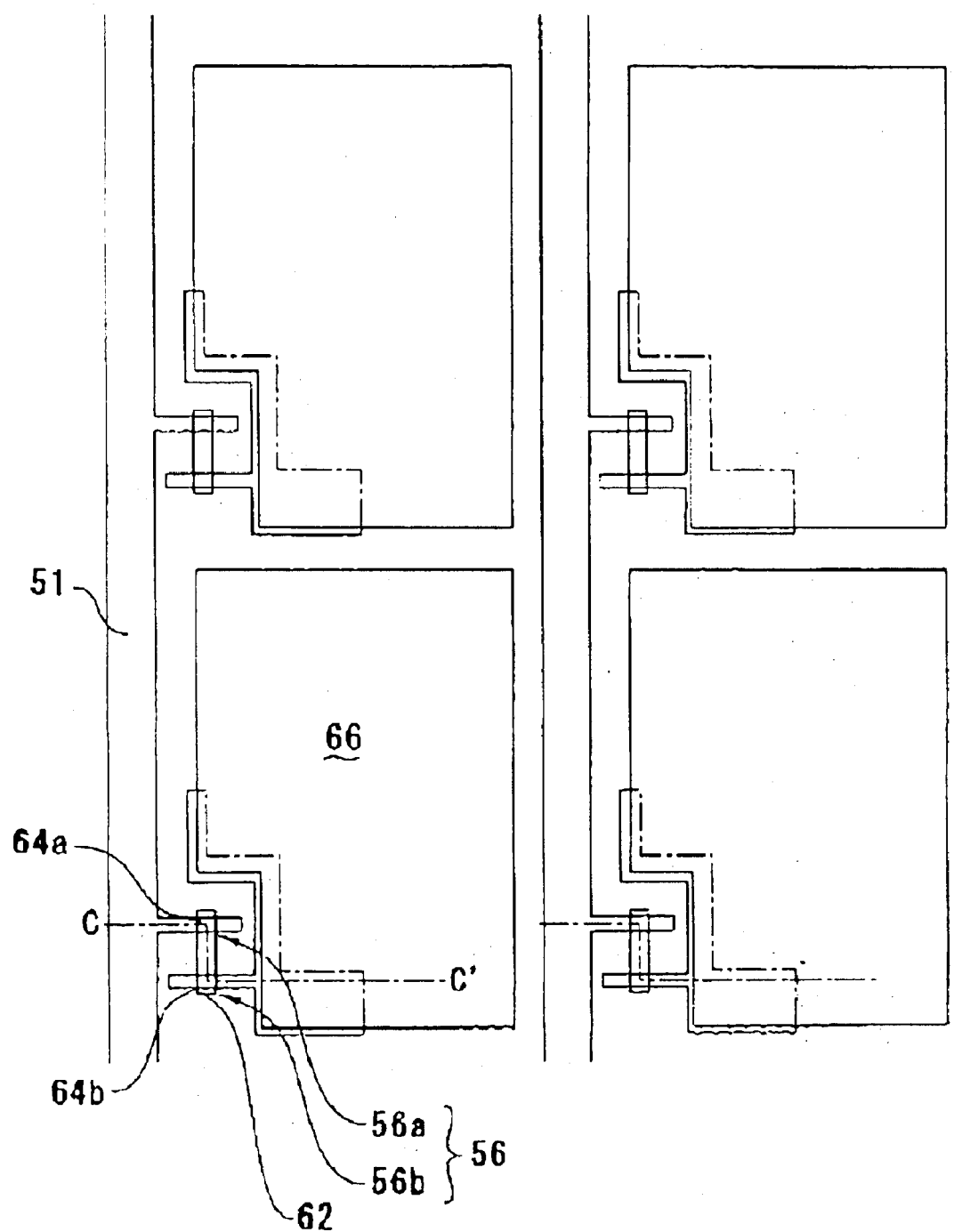
FIG. 4 is a plan view of several pixels and corresponding terminals of an element substrate of a pair of substrates sandwiching and holding a liquid crystal layer in the liquid crystal device to which the present invention is applied.

FIG. 4 is a plan view of several pixels of the element substrate, of the pair of substrates sandwiching and holding the liquid crystal layer in the liquid crystal panel 2. FIGS.

5(a) and 5(b) are a sectional view taken along the line C–C' indicated in FIG. 4 and a perspective view of the TFD element, respectively.

Each of the TFD elements 56 described with reference to FIG. 1 generally has a structure in which two TFD elements are connected in series (back-to-back structure), as shown in FIGS. 4, 5(a), and 5(b), in order to reduce the difference (polar difference) between the amounts of current flowing in the element in accordance with positive and negative applied voltages. More particularly, the TFD element 56 has a structure in which an island-shaped lower electrode 62 having an anodic oxide film 63 composed of Ta (tantalum) on the surface thereof, a first upper electrode 64a extending from the scanning line 51 and partially overlapping with the lower electrode 62 having the anodic oxide film 63 interposed therebetween, and a second upper electrode 64b partially overlapping with the lower electrode 62 having the anodic oxide film 63 interposed therebetween are provided, and also wherein a first TFD element 56a is formed of the lower electrode 62, the anodic oxide film 63, and the first upper electrode 64a, and a second TFD element 56b is formed of the lower electrode 62, the anodic oxide film 63, and the second upper electrode 64b. The pixel electrode 66 partially overlaps with the second upper electrode 64b. Also, the scanning line 51, the first upper electrode 64a, and the second upper electrode 64b are generally composed of Cr (chromium).

In order to form the liquid crystal device 1, which is of the transmissive type, a transparent conductive film such as an ITO film is used for the pixel electrodes 66. When each of the pixel electrodes 66 is composed of an Al (aluminum) film, a silver alloy film, or the like, and has an opening or the like formed therein, the liquid crystal device 1 of the transflective-type, which performs display in both reflective and transmissive modes, can be achieved.

Structure of Illumination System

FIGS. 6(a), 6(b), and 6(c) are illustrations of a light guiding film for use in the liquid crystal device shown in FIG. 2. FIGS. 7(a) and 7(b) are illustrations of a low refractive index layer formed in the counter substrate of the liquid crystal device shown in FIG. 2 and the advantages of this low refractive index layer, respectively.

Referring again to FIGS. 2 and 3, in order to provide a backlight function in the liquid crystal device 1, in this embodiment, first of all, of the element substrate 7a and the counter substrate 7b holding the liquid crystal layer L therebetween, the counter substrate 7b lying opposite to the other substrate from which display light is emitted has light sources 22 including two LEDs (point sources) or the like disposed at the other end thereof lying opposite to the one end thereof at which the terminals 13a are formed. As shown in the figures, the counter substrate 7b has an end 7c that extends from the element substrate 7a, and the light sources 22 mounted on a circuit board (not shown) face the end or side surface of this extended portion.

Also, in this embodiment, the counter substrate 7b has a light guiding film 4 fixedly bonded to the polarizer 12b by having an adhesive agent 4a interposed therebetween so as to face one surface thereof which is opposite to another surface thereof holding the liquid crystal layer L. As a result, the counter substrate 7b has no conventional thick light guiding plate disposed on the one surface thereof which is opposite to the other surface thereof holding the liquid crystal layer L.

In addition, the light guiding film 4 has a light-source reflective layer 41 disposed on one surface thereof which is opposite to another surface thereof close to the counter substrate 7b. The light-source reflective layer 41 is formed of a sheet-like material, a metal film obtained by forming a film on the light guiding film 4 by deposition or the like.

The light guiding film 4 is a transparent film having a thickness of about 0.1 mm and composed of an acrylic resin, a polycarbonate resin, a cellulosic resin, a norbornene resin, or the like. As shown in FIG. 6(a), the light guiding film 4 has a plurality of fine depressions 4b formed on the other surface thereof which is opposite to the one surface thereof facing the counter substrate 7b, and, as shown in FIG. 6(b), each depression 4b has a fine light-deflecting slanted surface 4c on the inner surface thereof, extending in an upward oblique direction towards the light sources 22. Stated another way, each depression 4b provides a ramp or slanted surface 4c tapering inwardly and diverging away from the end 7c for reflecting light from LED's 22 toward the substrate 7b (see FIGS. 6(c) and 3).

As shown in FIG. 6(a), although a large number of the light-deflecting slanted surfaces 4c are formed in the light guiding film 4, since two LEDs serving as point sources are used as the light sources 22 in this embodiment, the light-deflecting slanted surfaces 4c are concentrically distributed so as to have their centers at the light sources 22. That is, surfaces 4c are oriented so that they face one of the light sources, at least for the depressions 4b located closer to the LED's as shown in FIG. 6(a). Each light-deflecting slanted surface 4c may have an arch shape having its inner side facing towards one of the light sources 22. Also, the light-deflecting slanted surface 4c may be formed as a projection instead of being formed as a depression 4b.

Also, in this embodiment, in the light guiding film 4, the light-deflecting slanted surfaces 4c lying far away from the light sources 22 are more densely formed (more closely spaced together) than those lying close to the light sources 22.

In addition, in this embodiment, as shown in FIG. 7(a), a light absorbing layer including the color filters 71R, 71G, and 71B, and the black matrix 72 is formed on the one surface of the counter substrate 7b holding the liquid crystal layer L, and a low refractive index layer 74 composed of magnesium fluoride (MgF, having a refractive index n=1.38) or the like is formed under the color filters 71R, 71G, and 71B, the black matrix 72, and so forth.

In this embodiment, each light-deflecting slanted surface 4c is formed at an angle "a" (FIG. 6(c)) in the range from about 35° to about 48° with respect to the surface of the light guiding film. Also, both the light guiding film 4 and the adhesive agent 4a have a refractive index equal to or greater than 1.49.

In the liquid crystal device 1 having the above-described structure, since the light sources 22 are disposed so as to face the side surface of the counter substrate 7b, light emitted from the light sources 22 is incident on the counter substrate 7b and travels therein along its surface. On this occasion, the light emitted from the surface of the counter substrate 7b holding the liquid crystal layer L is incident on the liquid crystal layer L so as to contribute to performing display.

On the other hand, the light emitted from the one surface of the counter substrate 7b lying opposite to the other surface holding the liquid crystal layer L is incident on the light guiding film 4 via the polarizer 12b and travels in the light guiding film 4 along its surface while being reflected at the light-source reflective layer 41. On this occasion, as shown in FIG. 6(c), upon encountering one of the light-deflecting slanted surfaces 4c formed in the light guiding film 4, the light is deflected; is emitted towards the counter substrate 7b; and is incident on the liquid crystal layer L so as to contribute to performing display.

As described above, in this embodiment, by using the light sources 22 emitting light onto the side surface of the counter substrate 7b, the light guiding film 4 having a large number of the light-deflecting slanted surfaces 4c, and the light-source reflective layer 41 disposed behind the light guiding film 4, since the counter substrate 7b plays part of the role of the conventional light guiding plate, the thick light guiding plate can be eliminated, thereby leading to a thin structure of the liquid crystal device 1.

Also, in the light guiding film 4, the light-deflecting slanted surfaces 4c are concentrically distributed so as to have their centers at the corresponding light sources 22, and, in addition, the light-deflecting slanted surfaces 4c have a low-density distribution when lying close to the light sources 22 and a high-density distribution when lying far away from the light sources 22. With this configuration, light incident on the liquid crystal layer L is uniformly distributed over the surface thereof, whereby a high-quality image can be displayed.

In addition, when the counter substrate 7b has the light absorbing layer, including the color filters 71R, 71G, and 71B, and the black matrix 72, formed on the surface thereof holding the liquid crystal layer L, for example, as shown by the arrow L2 indicated in FIG. 7(b), light once having passed through one of the color filters 71R, 71G, and 71B passes again through one of the color filters 71R, 71G, and 71B, thereby causing light loss or the like. Meanwhile, in this embodiment, as described with reference to FIG. 7(a), the low refractive index layer 74 is formed under the color filters 71R, 71G, and 71B, the black matrix 72, and so forth. With this configuration, as shown by the arrow L1, even when light is incident at a rather large angle, since the light travels in the counter substrate 7b while being reflected at the interface between the substrate 7b and the low refractive index layer 74, the light is prevented from being absorbed by the light absorbing layer. Accordingly, advantages such as an improved transmission efficiency of the light traveling in the substrate are obtained.

Second Embodiment

FIGS. 8(a) and 8(b) are illustrations of a liquid crystal device according to a second embodiment of the present invention and a reflective polarizer for use in this liquid crystal device, respectively.

As shown in FIG. 8(a), in the liquid crystal device according to this embodiment, the counter substrate 7b and the light guiding film 4 have a reflective polarizer 200 therebetween which is disposed between the polarizer 12b and the counter substrate 7b. The reflective polarizer 200 disposed as mentioned above may be a laminate formed together with, for example, the polarizer 12b, or formed alone.

As shown in FIG. 8(b), the reflective polarizer 200 has an alternately laminated structure of two kinds of layers (A-layer and B-layer) which have substantially the same refractive index in one of two directions parallel to the surface thereof and orthogonal to each other and which have mutually different refractive indexes in the other direction. That is, when the X-axis, Y-axis, and Z-axis directions are mutually orthogonal to each other, in the reflective polarizer 200, the refractive index ($n_{AX}$) of the A-layer in the X-axis direction is different from the refractive index ($n_{BX}$) of the B-layer in the X-axis direction while the refractive index ($n_{AY}$) of the A-layer in the Y-axis direction is substantially the same as the refractive index ($n_{BY}$) of the B-layer in the Y-axis direction. Accordingly, part of the light which is incident on the reflective polarizer 200 and which is linearly polarized light in the Y-axis direction passes through the reflective polarizer 200.

Also, when the thicknesses of the A-layer and the B-layer in the Z-axis direction are defined as $t_A$ and $t_B$, respectively, and the wavelength of the incident light is defined as $\lambda$, the reflective polarizer 200 is set so as to satisfy the following expression:

$$t_A \times n_{AX} + t_B \times n_{AX} n_{BX} = \lambda/2.$$

With this arrangement, part of the light having the wavelength $\lambda$ which is incident on the reflective polarizer 200 and which is linearly polarized light in the X-axis direction is reflected at the reflective polarizer 200. Thus, by arranging the A-layers and the B-layers in the Z-axis direction so as to have various thicknesses, the reflective polarizer 200 reflects the linearly polarized light, which is part of the incident light having a wide range of visible wavelengths, in the X-axis direction. For Example, the A-layers may be composed of drawn polyethylene naphthalate (PEN) and the B-layers may be composed of copolyester consisting of naphthalene dicarboxylic acid and telephathalic acid. Thus, the reflective polarizer 200 is a flexible substrate. It is needless to say that the material of the reflective polarizer 200 is not limited to the above-mentioned ones; but its material can be selected as needed. The reflective polarizer 200 mentioned above is disclosed in detail in PCT Japanese Translation Patent Publication No. 9-506985 which is hereby incorporated by reference.

Accordingly, when the liquid crystal device 1 shown in FIG. 8(a) has a structure in which, for example, of P-polarized light and S-polarized light, the reflective polarizer 200 transmits the P-polarized light to the polarizer 12b and reflects the S-polarized light towards the counter substrate 7b while the polarizer 12b transmits the P-polarized light and absorbs the S-polarized light, the S-polarized light component which would be absorbed by the polarizer 12b can be recycled and can be used as display light. As a result, since the light utilization efficiency improves, the luminance of the liquid crystal device 1 improves. Also, this structure reduces the difference between the luminance of the liquid crystal display 1 at the light entrance side thereof and that at the other side thereof, which occurs because the incident light traveling in the counter substrate 7b is absorbed by the polarizer 12b.

Third Embodiment

Figure 9:
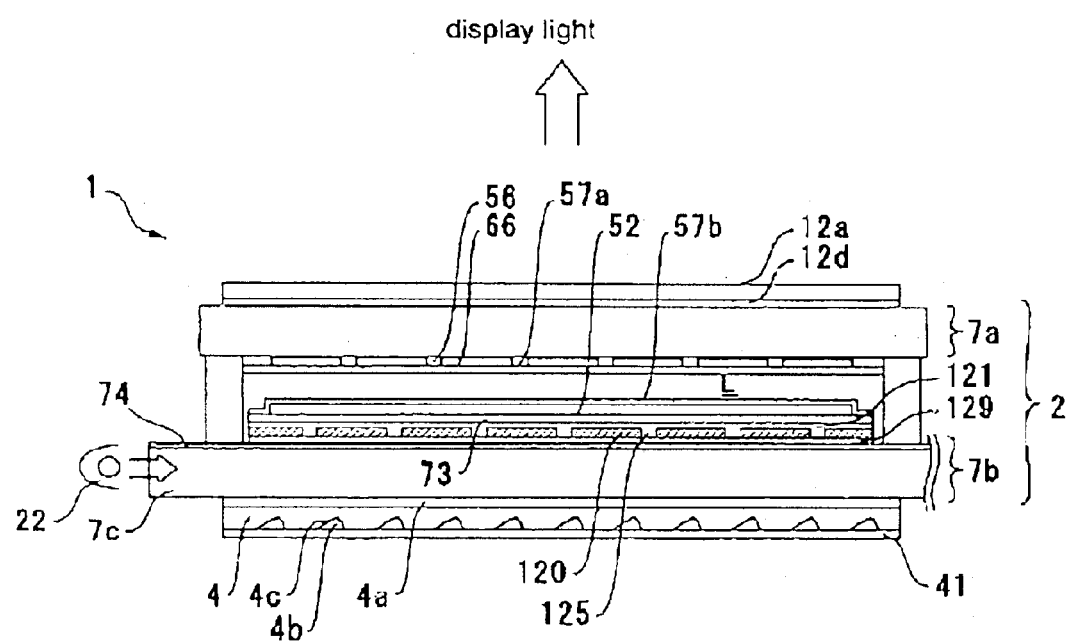
FIG. 9 is an illustration of a liquid crystal device according to a third embodiment of the present invention.
Figure 10:
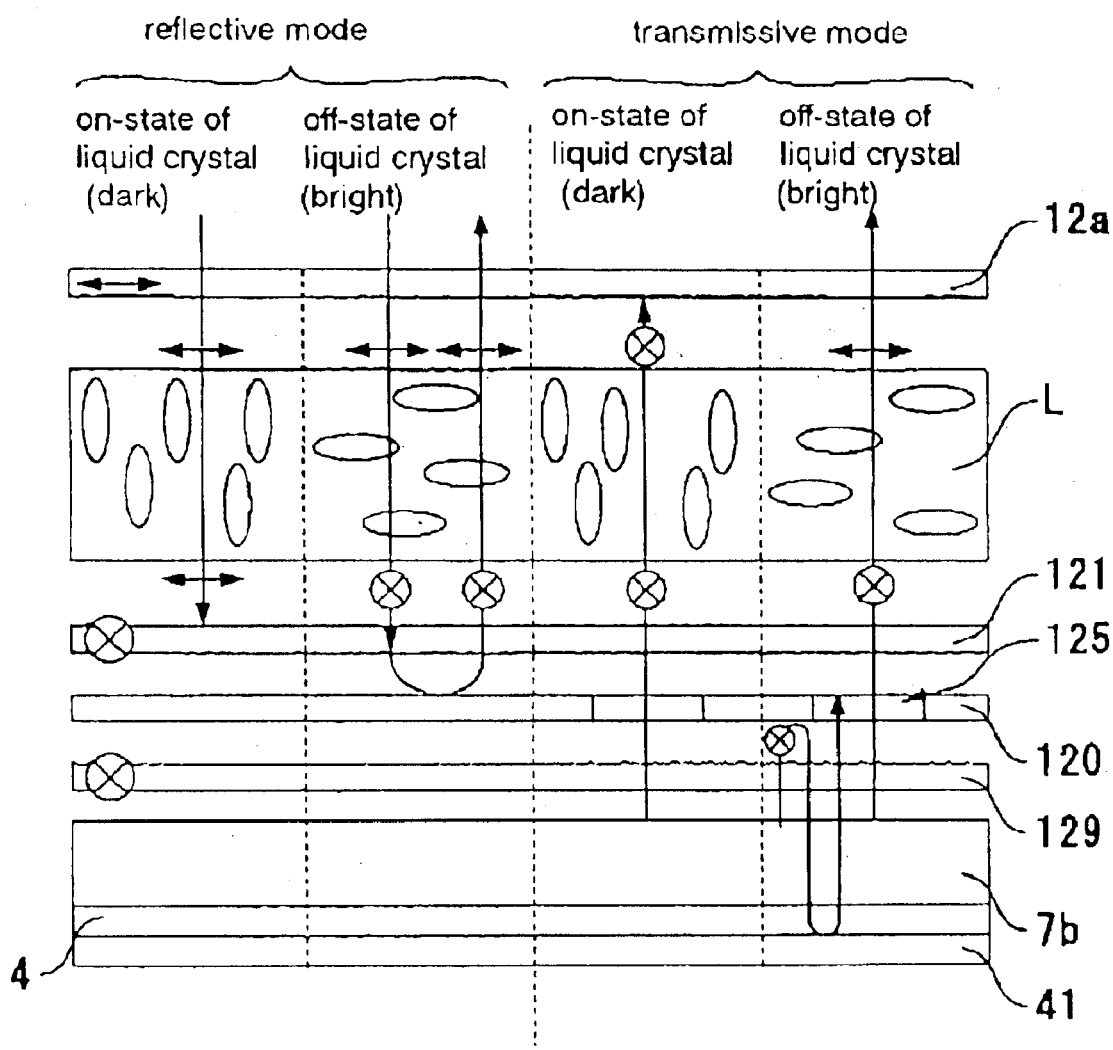
FIG. 10 is an illustration of a display operation of the liquid crystal device according to the third embodiment of the present invention.

FIGS. 9 and 10 are illustrations of a liquid crystal device according to a third embodiment of the present invention and a display operation of this liquid crystal device, respectively.

As shown in FIG. 9, the liquid crystal device 1 according to this embodiment is a transflective display device which functions as a reflective type when external light is sufficient and as a transmissive type when it is insufficient.

In this liquid crystal device 1, of the element substrate 7a and the counter substrate 7b holding the liquid crystal layer L therebetween, the counter substrate 7b lying opposite to the other substrate from which display light is emitted has the light sources 22 including two LEDs (point sources) or the like disposed at the other end thereof lying opposite to the one end thereof at which the terminals 13a are formed in a similar fashion to that in the first embodiment. Also, the counter substrate 7b has the light guiding film 4 fixedly bonded to the polarizer 12b by having the adhesive agent 4a interposed therebetween so as to face the one surface thereof which is opposite to the other surface thereof holding the liquid crystal layer L. In addition, the light guiding film 4 has the light-source reflective layer 41 on the one surface thereof which is opposite to the other surface thereof facing the counter substrate 7b.

However, in the liquid crystal device 1 according to this embodiment, different from that according to the first embodiment, the counter substrate 7b does not have the polarizer 12b as an independent member disposed on the one surface thereof lying opposite to the other surface holding the liquid crystal layer L. Instead, as will be described below, the counter substrate 7b has inner polarizer layers formed on the other surface thereof holding the liquid crystal layer L.

In the liquid crystal device 1 according to this embodiment, the counter substrate 7b has the low refractive index layer 74, a first inner polarizer layer 129, the light reflective layer 120 for reflective display which partially transmits light, and a second inner polarizer layer 121 formed on the other surface thereof holding the liquid crystal layer L, in that order. The light reflective layer 120 for reflective display is a transflective layer having small light-transmitting holes 125 formed therein for transmitting light to a metal layer composed of aluminum, an aluminum alloy, silver, a silver alloy, or the like. Also, the inner polarizer layers 129 and 121 are formed such that layers composed of thermotropic polymer liquid crystal containing a water-soluble, lyotropic-liquid-crystal dyestuff material or a dichroic dye are formed and then undergo patterning by photolithography. On this occasion, the inner polarizer layers 129 and 121 may have protective layers which are water-insoluble or hard to be dissolved into water.

Since the other components are basically the same as those in the first embodiment, parts having the common functions are illustrated by the same reference numerals, and the description thereof is omitted.

In the liquid crystal device 1 having the above-described structure, in a reflective mode, as shown in the left part of FIG. 10, external light incident on the liquid crystal device 1 is converted into linearly polarized light traveling parallel to the plane of the figure by the polarizer 12a having a transmission axis parallel to the plane of the figure and is incident on the liquid crystal layer L. When the liquid crystal layer L is in an on-state, this incident light is incident on the second inner polarizer layer 121 while remaining as the linearly polarized light traveling parallel to the plane of the figure and is then absorbed by the second inner polarizer layer 121 having a transmission axis perpendicular to the plane of the figure. With this arrangement, a dark display of dots is performed.

Meanwhile, when the liquid crystal layer L is in an off-state, the above incident light is converted into linearly polarized light traveling perpendicular to the plane of the figure by the operation of the liquid crystal layer L, and is incident on and passes through the second inner polarizer layer 121 having the transmission axis perpendicular to the plane of the figure. Then, after being reflected at the light reflective layer. 120 for reflective display, the above light passes again through the second inner polarizer layer 121 and is then incident on the liquid crystal layer L. Subsequently, this incident light is converted into linearly polarized light traveling parallel to the plane of the figure by the operation of the liquid crystal layer L, and is transmitted through and emitted from the polarizer 12a. With this arrangement, a bright display of dots is performed.

On the other hand, in a transmissive mode, as shown in the right part of FIG. 10, light emitted from the counter substrate 7b is converted into linearly polarized light traveling perpendicular to the plane of the figure by the first inner polarizer layer 129, part of the emitted light passes through the light-transmitting holes 125 of the light reflective layer 120 for reflective display; is incident on the second inner polarizer layer 121; passes through the second inner polarizer layer 121 having the transmission axis perpendicular to the plane of the figure; and is incident on the liquid crystal layer L. When the liquid crystal layer L is in an on-state, this incident light is absorbed by the polarizer 12a while remaining as the linearly polarized light traveling perpendicular to the plane of the figure, without undergoing the operation of the liquid crystal layer L. With this arrangement, a dark display of dots is performed.

Meanwhile, in a transmissive mode, the remaining part of the light emitted from the counter substrate 7b passes through the first inner polarizer layer 129; is reflected at the lower surface of the light reflective layer 120 for reflective display since the emitted light has been converted into the linearly polarized light traveling perpendicular to the plane of the figure; passes through the first inner polarizer layer 129; and is again incident on the counter substrate 7b. Then, this incident light passes through the light guiding film 4; is reflected at the light-source reflective layer 41; and is again emitted from the counter substrate 7b, thereby leading to higher light utilization efficiency.

Meanwhile, when the liquid crystal layer L is in an off-state, light incident on the liquid crystal layer L is converted into linearly polarized light traveling parallel to the plane of the figure by the operation of the liquid crystal layer L; is incident on the polarizer 12a; and is subsequently transmitted through and emitted from the polarizer 12a. With this arrangement, a bright display of dots is performed.

As described above, also in the liquid crystal device 1 according to this embodiment, since the counter substrate 7b plays part of the role of the conventional light guiding plate, the thick light guiding plate can be eliminated, thereby providing the same advantages including a thin structure of the liquid crystal device 1 as those in the first embodiment.

Also, in this embodiment, when a bright display is performed in a transmissive mode, since light emitted from the liquid crystal layer L and incident on the polarizer 12a is converted into linearly polarized light, a brighter display is achieved also in the transmissive mode.

When the second inner polarizer layer 121 is formed so as not to two-dimensionally overlap the light-transmitting holes 125, light incident on the liquid crystal layer L is not transmitted through the second inner polarizer layer 121 in the transmissive mode. Accordingly, this incident light is not absorbed by the second inner polarizer layer 121, thereby leading to higher light utilization efficiency.

Fourth Embodiment

Figure 11:
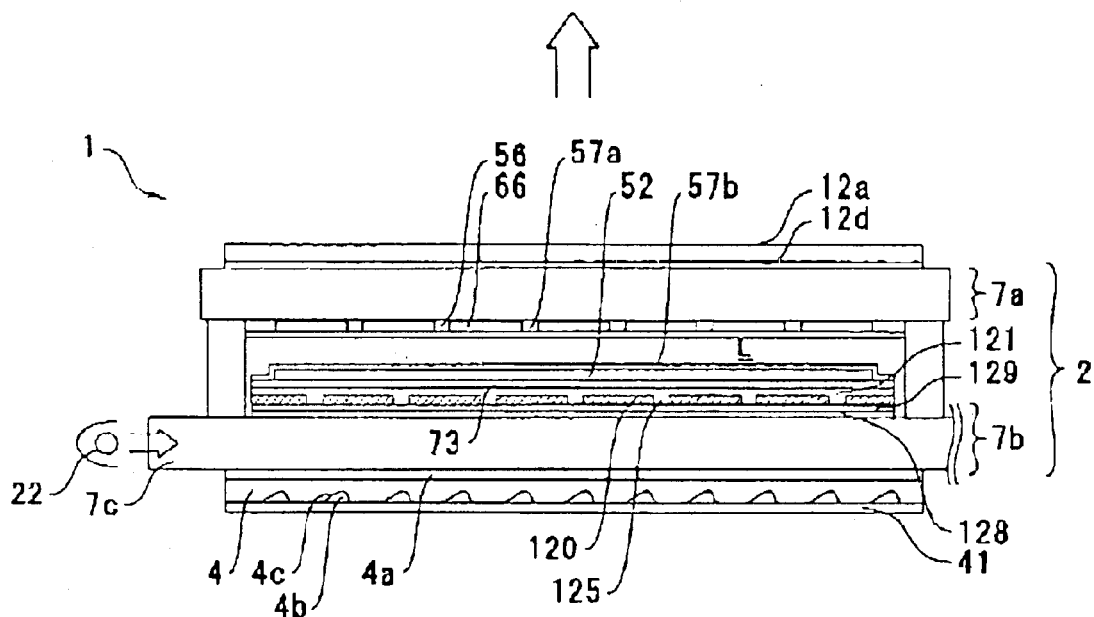
FIG. 11 is an illustration of a liquid crystal device according to a fourth embodiment of the present invention.

FIG. 11 is an illustration of a liquid crystal device according to a fourth embodiment of the present invention.

As shown in FIG. 11, in the same fashion as that in the third embodiment, the liquid crystal device 1 according to this embodiment functions also as a reflective type when external light is sufficient and as a transmissive type when it is insufficient.

In this liquid crystal device 1, in a similar fashion to that in the first embodiment, of the element substrate 7a and the counter substrate 7b holding the liquid crystal layer L therebetween, the counter substrate 7b lying opposite to the other substrate and from which display light is emitted has the light sources 22 including two LEDs (point sources) or the like disposed at the other end thereof lying opposite to the one end thereof at which the terminals 13a are formed. Also, the counter substrate 7b has the light guiding film 4 fixedly bonded to the polarizer 12b by having the adhesive agent 4a interposed therebetween so as to face the one surface thereof which is opposite to the other surface thereof holding the liquid crystal layer L. In addition, the light guiding film 4 has the light-source reflective layer 41 on the one surface thereof which is opposite to the other surface thereof facing the counter substrate 7b.

Also, in the liquid crystal device 1 according to this embodiment, the counter substrate 7b has an inner reflective polarizer layer 128, the first inner polarizer layer 129, the light reflective layer 120 for reflective display which partially transmits light, and the second inner polarizer layer 121 formed on the other surface thereof holding the liquid crystal layer L, in that order. The light reflective layer 120 for reflective display is a transflective layer having the small light-transmitting holes 125 formed therein for transmitting light to a metal layer composed of aluminum, an aluminum alloy, silver, a silver alloy, or the like.

Since the other components are basically the same as those in the first and third embodiments, parts having the common functions are illustrated by the same reference numerals, and the description thereof is omitted.

In the liquid crystal device 1 having the above-described structure, as described about the third embodiment with reference to FIG. 10, in a reflective mode, external light incident on the liquid crystal device 1 is converted into linearly polarized light traveling parallel to the plane of the figure by the polarizer 12a having the transmission axis parallel to the plane of the figure and is incident on the liquid crystal layer L. When the liquid crystal layer L is in an on-state, this incident light is incident on the second inner polarizer layer 121 while remaining as the linearly polarized light traveling parallel to the plane of the figure and is then absorbed by the second inner polarizer layer 121 having the transmission axis perpendicular to the plane of the figure. With this arrangement, a dark display of dots is performed.

Meanwhile, when the liquid crystal layer L is in an off-state, the above incident light is converted into linearly polarized light traveling perpendicular to the plane of the figure by the operation of the liquid crystal layer L, and is incident on and passes through the second inner polarizer layer 121 having the transmission axis perpendicular to the plane of the figure. Then, after being reflected at the light reflective layer 120 for reflective display, the above light passes again through the second inner polarizer layer 121 and is then incident on the liquid crystal layer L. Subsequently, this incident light is converted into linearly polarized light traveling parallel to the plane of the figure by the operation of the liquid crystal layer L, and is transmitted through and emitted from the polarizer 12a. With this arrangement, a bright display of dots is performed.

On the other hand, in a transmissive mode, as shown in the right part of FIG. 10, light emitted from the counter substrate 7b is converted into linearly polarized light traveling perpendicular to the plane of the figure by the inner reflective polarizer layer 128 and the first inner polarizer layer 129; passes through the light-transmitting holes 125 of the light reflective layer 120 for reflective display; is incident on the second inner polarizer layer 121; passes through the second inner polarizer layer 121 having the transmission axis perpendicular to the plane of the figure; and is incident on the liquid crystal layer L. When the liquid crystal layer L is in an on-state, this incident light is absorbed by the polarizer 12a while remaining as the linearly polarized light traveling perpendicular to the plane of the figure, without undergoing the operation of the liquid crystal layer L. With this arrangement, a dark display of dots is performed.

Meanwhile, when the liquid crystal layer L is in an off-state, light incident on the liquid crystal layer L is converted into linearly polarized light traveling parallel to the plane of the figure by the operation of the liquid crystal layer L; is incident on the polarizer 12a; and is subsequently transmitted through and emitted from the polarizer 12a. Accordingly, a bright display of dots is performed.

On this occasion, part of light which is emitted from the counter substrate 7b and which is not transmitted through the inner reflective polarizer layer 128 is reflected at the inner reflective polarizer layer 128, and is then repeatedly reflected by the light-source reflective layer 41 and the inner reflective polarizer layer 128. While being repeatedly reflected as described above, since its polarization direction varies gradually, part of the repeatedly reflected light can pass through the inner reflective polarizer layer 128, thereby leading to higher light utilization efficiency and thus achieving a brighter display.

Also, the counter substrate 7b preferably has a low refractive index layer disposed on the other surface thereof holding the liquid crystal layer L; that is, the counter substrate 7b and the inner reflective polarizer layer 128 preferably have the low refractive index layer interposed therebetween.

As long as the inner reflective polarizer layer 128 is provided, light passing through the counter substrate 7b is reflected at the inner reflective polarizer layer 128 even when the low refractive index layer is not provided; however, without the low refractive index layer, light at a small angle with the inner surface of the counter substrate 7b is also likely to be emitted. Since it is important to improve the front luminance of the liquid crystal device, the low refractive index layer is preferably provided in order to improve the front luminance.

Fifth Embodiment

Figure 12:
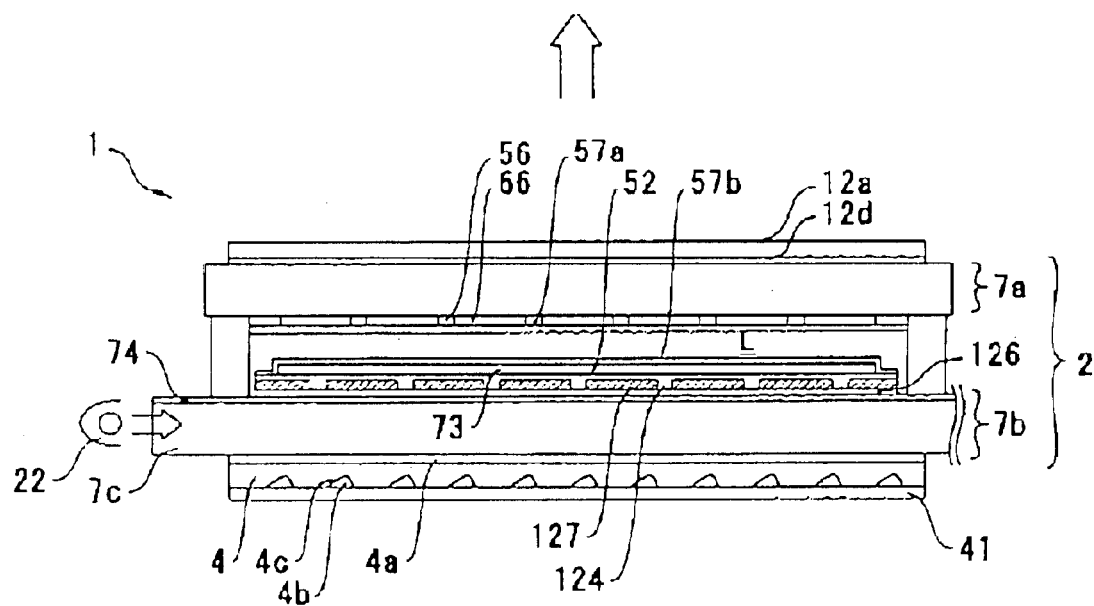
FIG. 12 is an illustration of a liquid crystal device according to a fifth embodiment of the present invention.
Figure 13:
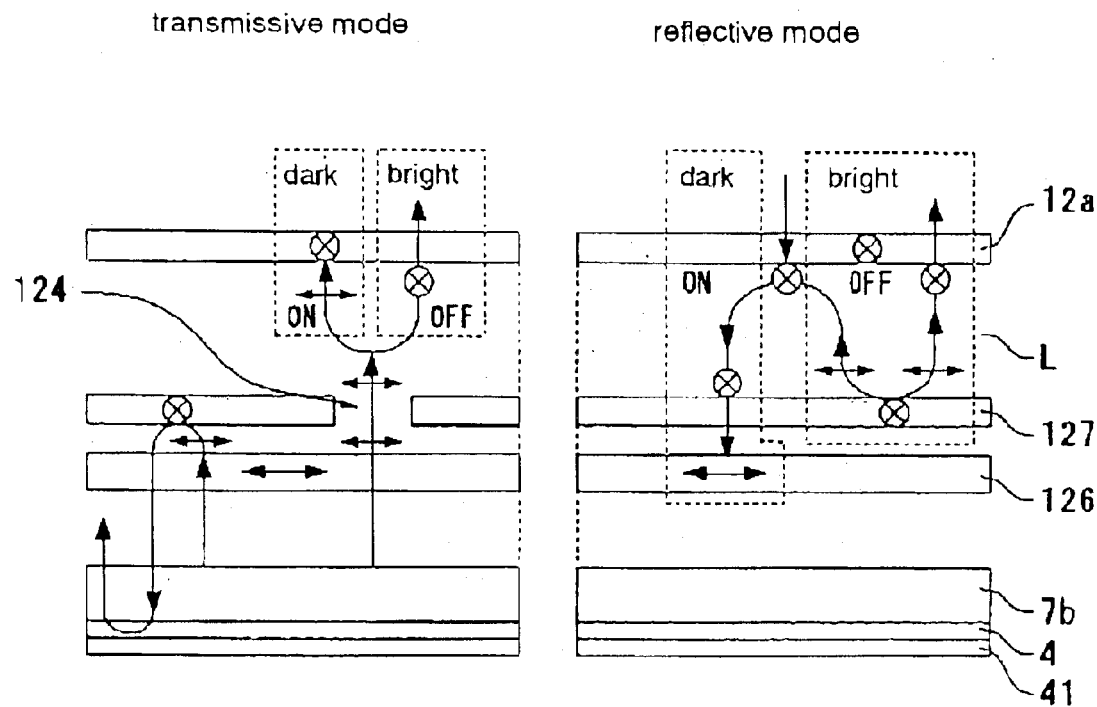
FIG. 13 is an illustration of a display operation of the liquid crystal device according to the fifth embodiment of the present invention.

FIGS. 12 and 13 are illustrations of a liquid crystal device according to a fifth embodiment of the present invention and a display operation of this liquid crystal device, respectively.

As shown in FIG. 12, in the same fashion as that in the third embodiment, the liquid crystal device 1 according to this embodiment is also a transflective display device which functions as a reflective type when external light is sufficient and as a transmissive type when it is insufficient.

In this liquid crystal device 1, in a similar fashion to that in the first embodiment, of the element substrate 7a and the counter substrate 7b holding the liquid crystal layer L therebetween, the counter substrate 7b lying opposite to the other substrate and from which display light is emitted has the light sources 22 including two LEDs (point sources) or the like disposed at the other end thereof lying opposite to the one end thereof at which the terminals 13a are formed. Also, the counter substrate 7b has the light guiding film 4 fixedly bonded to the polarizer 12b by having the adhesive agent 4a interposed therebetween so as to face the one surface thereof which is opposite to the other surface thereof holding the liquid crystal layer L. In addition, the light guiding film 4 has the light-source reflective layer 41 on the one surface thereof which is opposite to the other surface thereof facing the counter substrate 7b.

Also, in the liquid crystal device 1 according to this embodiment, the counter substrate 7b has the low refractive index layer 74, an inner polarizer layer 126, and an inner reflective polarizer layer 127 formed of a wire-gird layer formed on the other surface thereof holding the liquid crystal layer L, in that order. The inner reflective polarizer layer 127 formed of a wire-grid layer is a metal layer which has a plurality of slit-shaped openings formed therein with a predetermined pitch and which is composed of aluminum, an aluminum alloy, silver, a silver alloy, or the like, and the inner reflective polarizer layer 127 has small light transmission holes 124 formed therein for transmitting light. Also, the longitudinal direction of the slit-shaped openings of the inner reflective polarizer layer 127 lies parallel to the transmission axis of the inner polarizer layer 126 which is substantially orthogonal to the transmission axis of the polarizer 12a.

The inner reflective polarizer layer 127 having the above-mentioned structure reflects light traveling parallel to the longitudinal direction of the slit-shaped openings and transmits light traveling orthogonal to the longitudinal direction of the slit-shaped openings. In other words, light traveling orthogonal to the longitudinal direction of the slit-shaped openings passes through the inner reflective polarizer layer 127, and light traveling parallel to the longitudinal direction of the slit-shaped openings is reflected at the inner reflective polarizer layer 127.

Since the other components are basically the same as those in the first and third embodiments, parts having the common functions are illustrated by the same reference numerals, and the description thereof is omitted.

In the liquid crystal device 1 having the above-described structure, as shown in the left part of FIG. 13, in a transmissive mode, light emitted from the counter substrate 7b is converted into linearly polarized light traveling parallel to the plane of the figure by the inner polarizer layer 126; passes through the light transmission holes 124 of the inner reflective polarizer layer 127; and is incident on the liquid crystal layer L. When the liquid crystal layer L is in an on-state, this incident light is absorbed by the polarizer 12a while remaining as the linearly polarized light traveling parallel to the plane of the figure, without undergoing the operation of the liquid crystal layer L. With this arrangement, a dark display of dots is performed.

Meanwhile, when the liquid crystal layer L is in an off-state, the light incident on the liquid crystal layer L is converted into the linearly polarized light traveling perpendicular to the plane of the figure by the operation of the liquid crystal layer L and is incident on the polarizer 12a. Then, this incident light is transmitted through and emitted from the polarizer 12a. With this arrangement, a bright display of dots is performed.

On this occasion, part of the light emitted from the counter substrate 7b is not transmitted through the inner reflective polarizer layer 127. This part of the light is reflected at the inner reflective polarizer layer 127 and is then repeatedly reflected by both the light-source reflective layer 41 and the inner reflective polarizer layer 127. While being repeatedly reflected as described above, part of the repeatedly reflected light passes through the light transmission holes 124 of the inner reflective polarizer layer 127 and is incident on the liquid crystal layer L, thereby leading to higher light utilization efficiency and thus achieving a brighter display.

On the other hand, in a reflective mode, as shown in the right part of FIG. 13, external light incident on the liquid crystal device 1 is converted into linearly polarized light traveling perpendicular to the plane of the figure by the polarizer 12a having the transmission axis perpendicular to the plane of the figure and is incident on the liquid crystal layer L. When the liquid crystal layer L is in an on-state, this incident light passes through the inner reflective polarizer layer 127 while remaining as the linearly polarized light traveling perpendicular to the plane of the figure and is then absorbed by the inner polarizer layer 126 having a transmission axis perpendicular to the plane of the figure. With this arrangement, a dark display of dots is performed.

Meanwhile, when the liquid crystal layer L is in an off-state, this incident light is converted into the linearly polarized light traveling parallel to the plane of the figure by the operation of the liquid crystal layer L; is reflected at the inner reflective polarizer layer 127; and is incident on the liquid crystal layer L. Then, this incident light is converted into the linearly polarized light traveling perpendicular to the plane of the figure by the operation of the liquid crystal layer L, and is transmitted through and emitted from the polarizer 12a. With this arrangement, a bright display of dots is performed.

Sixth Embodiment

Figure 14:
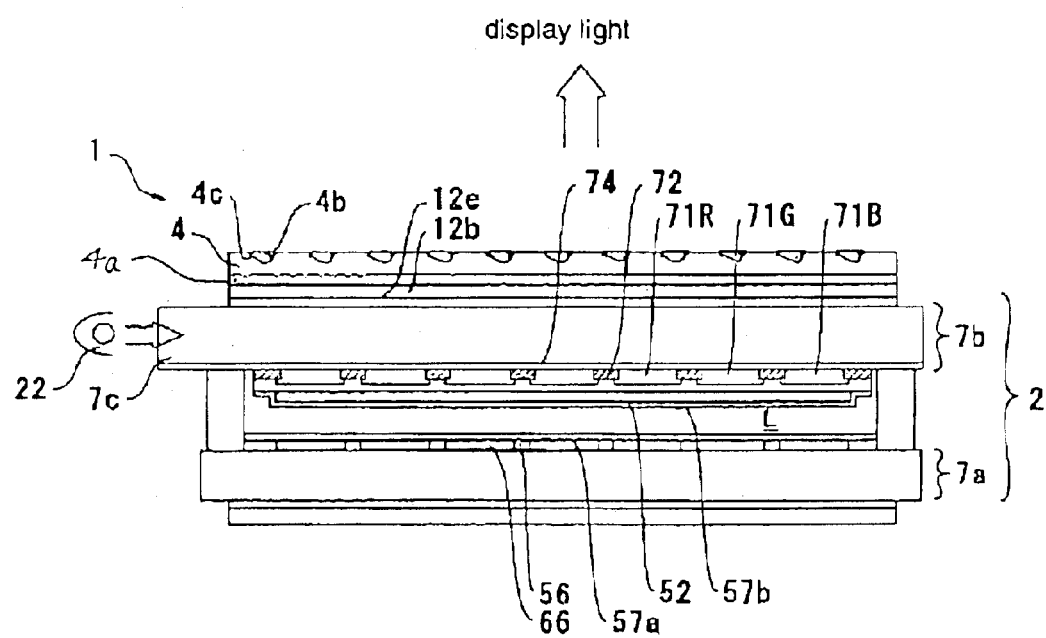
FIG. 14 is a sectional view of a liquid crystal device according to a sixth embodiment of the present invention.

FIG. 14 is a sectional view of a liquid crystal device according to a sixth embodiment of the present invention.

Although the liquid crystal device according to the first embodiment is provided with a backlight function by way of example, the present invention may be applied to the liquid crystal device shown in FIG. 14, having a front light function built therein. Although the liquid crystal device having a front light function has some different points from that having a backlight function; for example, the former device requires that its pixel electrodes are reflective electrodes or that its liquid crystal panel has a reflective surface by, for example, providing a reflective layer under the pixel electrodes, since these two devices have a common basic structure, mutually corresponding parts are illustrated by the same reference numerals and the description thereof is omitted.

As shown in FIG. 14, also in the liquid crystal device 1 according to this embodiment, the element substrate 7a has the plurality of pixel electrodes 66 in a matrix array. Also, the counter substrate 7b has the plurality of data lines 52 formed on the inner surface thereof in a stripe array and the polarizer 12b bonded to the outer surface thereof by having the adhesive agent 12e interposed therebetween. In addition, the color filters 71R, 71G, and 71B for R (red), G (green), and B (blue) colors are formed in a predetermined array in regions that face the pixel electrodes 66, above the counter substrate 7b, and the black matrix 72 is formed in the other regions that do not face the pixel electrodes 66.

In order to provide a front light function to the liquid crystal device 1 as described above, in this embodiment, of the element substrate 7a and the counter substrate 7b holding the liquid crystal layer L therebetween, the counter substrate 7b from which display light is emitted has the light sources 22 including two LEDs (point light sources) or the like disposed at the other end thereof lying opposite to the one end thereof at which the terminals 13a are formed. As shown in the figure, the counter substrate 7b has the end 7c that extends from the element substrate 7a, and the light sources 22 mounted on a circuit board (not shown) are disposed so as to face the side surface of this extended portion.

Also, in this embodiment, the counter substrate 7b has the polarizer 12b fixedly bonded on the one surface thereof lying opposite to the other surface holding the liquid crystal layer L by using the adhesive agent 12e, and the light guiding film 4 fixedly bonded to the polarizer 12b having the adhesive agent 4a interposed therebetween. With this arrangement, the counter substrate 7b does not have a conventional thick light guiding plate disposed on the one surface thereof lying opposite to the other surface holding the liquid crystal layer L.

Also in this embodiment, the light guiding film 4 is a transparent film having a thickness of about 0.1 mm and composed of an acrylic resin, a polycarbonate resin, a cellulosic resin, a norbornene resin, or the like. As described with reference to FIG. 6(a), the light guiding film 4 has the plurality of fine depressions 4b formed on the other surface thereof which is opposite to the one surface thereof facing the counter substrate 7b, and, as shown in FIG. 6(b), each depression 4b has the fine light-deflecting slanted surface 4c on the inner surface thereof, extending in an upward oblique direction towards the light sources 22.

Therefore, also in this embodiment, light emitted from the light sources 22 is incident on the counter substrate 7b and travels therein along its surface. On this occasion, of the two surfaces of the counter substrate 7b, light emitted from the one surface holding the liquid crystal layer L is incident on the liquid crystal layer L; is reflected at a given reflective layer; and is again emitted from the counter substrate 7b so as to contribute to performing display.

Meanwhile, of the two surfaces of the counter substrate 7b, light emitted from the other surface lying opposite to the one surface holding the liquid crystal layer L is incident on the light guiding film 4 via the polarizer 12b and travels in the light guiding film 4 along its surface. On this occasion, upon encountering one of the light-deflecting slanted surfaces 4c formed in the light guiding film 4, the light is deflected; is emitted towards the counter substrate 7b; is then incident on the liquid crystal layer L; is reflected at the given reflective layer; and is again emitted from the counter substrate 7b so as to contribute to performing display.

Accordingly, also in this embodiment, since the counter substrate 7b plays part of the role of the conventional light guiding plate, the thick light guiding plate can be eliminated, thereby leading to a thin structure of the liquid crystal device 1.

Also in this embodiment, although the counter substrate 7b has the light absorbing layer including the color filters 71R, 71G, and 71B, the black matrix 72 formed on the other surface thereof holding the liquid crystal layer L, since the low refractive index layer 74 is formed under them, light is prevented from being absorbed by the light absorbing layer, thereby providing advantages of, for example, improved transmission efficiency of light traveling in the substrate.

Other Embodiments

Although the light sources 22 have two LEDs in the foregoing embodiments by way of example, the light source 22 may have one LED disposed as shown in FIG. 15(a) or two LEDs disposed so as to face mutually opposing sides of the counter substrate 7b as shown FIG. 15(b). Also, in either of these two configurations, it is preferable that the light-deflecting slanted surfaces 4c formed in the light guiding film 4 be concentrically distributed so as to have their center(s) at the corresponding light source(s) 22 and that the light deflecting slanted surfaces 4c have a low-density distribution when lying close to the light source(s) 22 and a high-density distribution when lying far away from the light sources(s) 22.

The present invention is also applicable to a liquid crystal device using a cold cathode fluorescent tube as a light source, instead of a point light source such as an LED.

In addition, although the counter substrate 7b has an inner polarizer layer formed thereon in the foregoing embodiments, the element substrate 7a may have an inner polarizer layer formed thereon and the polarizer 12a may be omitted.

Furthermore, although the liquid crystal devices of an active matrix type using TFD elements as active elements for performing pixel-switching have been described in the foregoing embodiments, the present invention is not limited to these devices; but it is applicable to a liquid crystal device of an active matrix type using TFT elements as active elements for performing pixel-switching and also to a liquid crystal device of a passive matrix type. Moreover, the present invention is applicable to an electro-optical device in which an electro-optical material other than liquid crystal is used.

Figure 16:
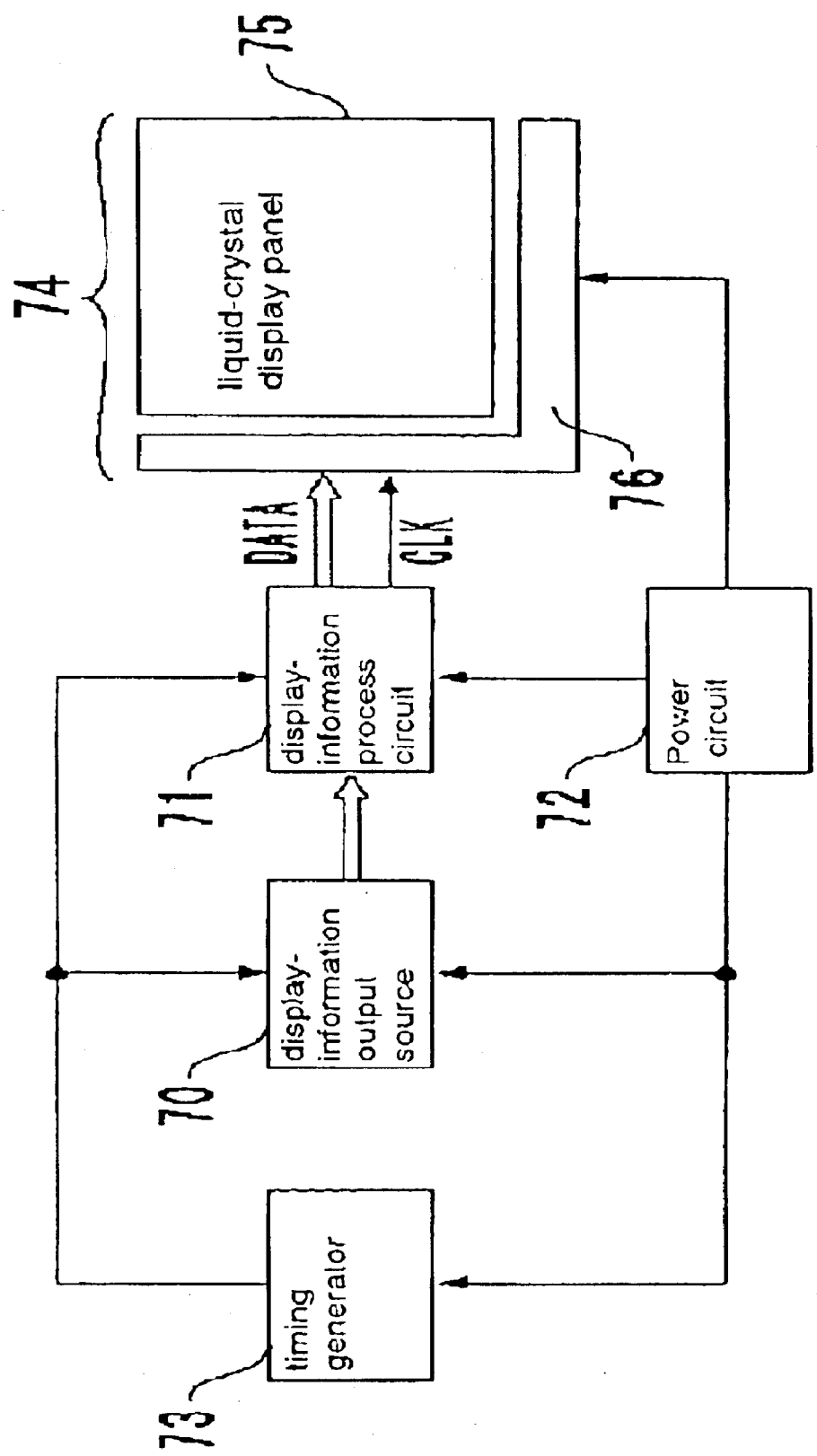
FIG. 16 is a block diagram illustrating the structure of a variety of electronic apparatuses using the liquid crystal device according to the present invention.
Figure 18:
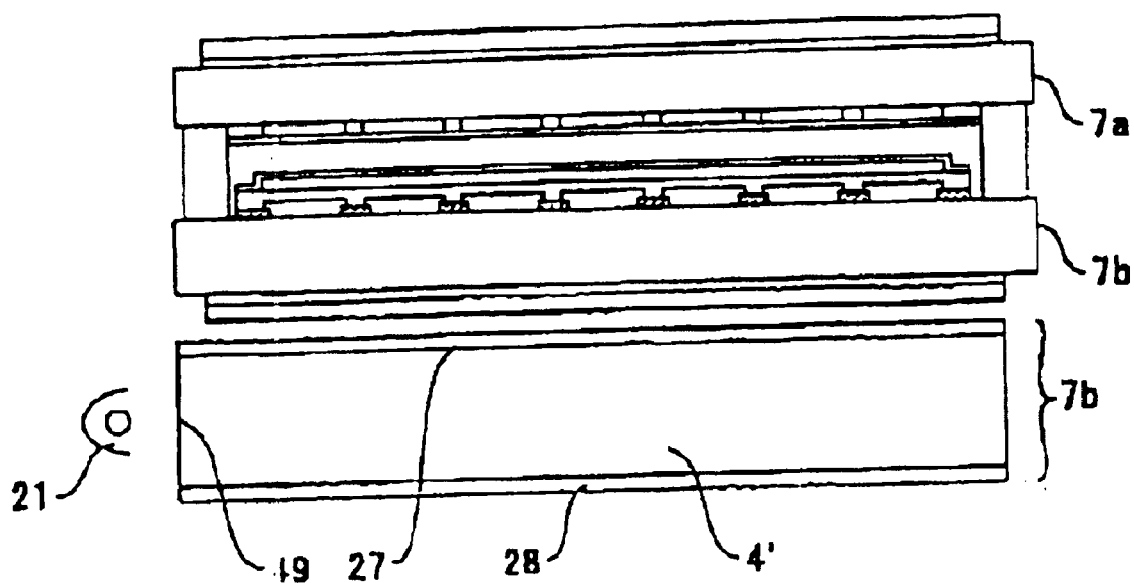
FIG. 18 is a sectional view of an example conventional liquid crystal device.

FIG. 16 illustrates an example application in which the liquid crystal device according to the present invention is used as a display device for one of various electronic apparatuses. An electronic apparatus shown here has a display-information output source 170, a display-information process circuit 171, a power circuit 172, a timing generator 173, and a liquid crystal device 174. The liquid crystal device 174 has a liquid-crystal display panel 175 and a drive circuit 176. The foregoing liquid crystal device 1 can be used for the liquid crystal device 174 and the liquid-crystal display panel 175.

The display-information output source 170 includes a memory such as a ROM (read only memory), a RAM (random access memory), a storage unit including a variety of disks, a tuning circuit for outputting tuned digital image signals, and so forth, and sends display information such as image signals with a predetermined format to the display-information process circuit 171 in response to a variety of clock signals generated by the timing generator 173.

The display-information process circuit 171 has a variety of known circuits such as a serial-parallel conversion circuit, an amplification and reversion circuit, a rotation circuit, a gamma correction circuit, and a clamp circuit; processes the input display information; and sends the processed image information together with a clock signal CLK to the drive circuit 176. The drive circuit 176 is a generic circuit including the scanning-line drive circuits 57, the data-line drive circuits 58, an inspection circuit, and so forth. The power circuit 172 supplies a predetermined voltage to each component.

FIGS. 17(a) and 17(b) are illustrations of a mobile personal computer and a portable phone as examples of the electronic apparatus according to the present invention.

As shown in FIG. 17(a), a personal computer 180 has a main body 182 including a keyboard 181 and a liquid crystal display unit 183. The liquid crystal display unit 183 is formed so as to include the foregoing liquid crystal device 1. Also, as shown in FIG. 17(b), a portable phone 190 has a plurality of operation buttons 191 and the liquid crystal device 1.

As described above, in the electro-optical device according to the present invention, of the pair of substrates holding the electro-optical material, light emitted from the light sources is incident on the one substrate and travels therein along its surface. On this occasion, of the two surfaces of the one substrate, the light emitted from the other surface of the one substrate holding the electro-optical material is incident on the electro-optical material so as to contribute to performing display. On the other hand, the light emitted from the one surface of the one substrate lying opposite to the other surface holding the electro-optical material is incident on the light guiding film directly or via the polarizer and travels in the light guiding film along its surface while being reflected at the light-source reflective layer. On this occasion, upon encountering one of the light-deflecting slanted surfaces formed in the light guiding film, the light is deflected; is emitted towards the one substrate; and is incident on the electro-optical material so as to contribute to performing display. As described above, according to the present invention, one of the pair of substrates holding the electro-optical material plays part of the roles of the conventional light guiding plate, whereby the thick light guiding plate can be eliminated, leading to a thin structure of the electro-optical device.

Japanese patent application No. 2002-060714 filed Mar. 6, 2002 and 2003-011230 filed Jan. 20, 2003 are hereby incorporated by reference.

What is claimed is:

1. An electro-optical device comprising:
   first and second substrates holding an electro-optical material therebetween;
   at least one light source emitting light to the first substrate; and
   a light guiding film having a plurality of slanted surfaces for deflecting light in the film towards the first substrate;
   wherein the second substrate lies opposite to the first substrate; and
   wherein the first substrate has a first inner polarizer layer, a light reflective layer for reflective display which partially transmits light, and a second inner polarizer layer, formed on a surface thereof holding the electro-optical material, in that order.

2. The electro-optical device according to claim 1, wherein the light guiding film has a light-source reflective layer disposed on one surface.

3. The electro-optical device according to claim 1, wherein the first substrate and the light guiding film have a polarizer disposed therebetween, and the polarizer and the first substrate have a reflective polarizer disposed therebetween.

4. The electro-optical device according to claim 1, wherein the first substrate has an inner polarizer layer formed on a surface thereof holding the electro-optical material.

5. The electro-optical device according to claim 1, wherein the first substrate is the substrate from which display light is emitted.

6. The electro-optical device according to claim 1, wherein the light source emits light onto a side surface of the first substrate.

7. The electro-optical device according to claim 1, wherein the slanted surfaces are formed as depressions in the light guiding film.

8. The electro-optical device according to claim 1, wherein the light guiding film is fixed to the one substrate directly or has at least one optical member interposed therebetween by using an adhesive agent.

9. The electro-optical device according to claim 1, wherein the light source is a point light source.

10. The electro-optical device according to claim 9, wherein the slanted surfaces are oriented so that they generally face a light source.

11. The electro-optical device according to claim 10, wherein the slanted surfaces lying further away from the light source are more closely spaced together than those lying closer to the light source.

12. The electro-optical device according to claim 1, wherein the first substrate has a fight absorbing layer on a surface thereof lying close to the electro-optical material and has a low refractive index layer under the light absorbing layer.

13. The electro-optical device according to claim 12, wherein the light absorbing layer is a light shielding film or a color filter layer.

14. The electro-optical device according to claim 1, wherein the electro-optical material is liquid crystal.

15. The electro-optical device of claim 1 in combination with a display unit for an electronic apparatus.

16. An electro-optical device comprising:
   first and second substrates holding an electro-optical material therebetween;
   at least one light source emitting light to the first substrate; and
   a light guiding film having a plurality of slanted surfaces for deflecting light in the film towards the first substrate;
   wherein the second substrate lies opposite to the first substrate;
   wherein the first substrate has an inner reflective polarizer layer, a first inner polarizer layer, a light reflective layer for reflective display which partially transmits light, and a second inner polarizer layer, formed on a surface thereof holding the electro-optical material, in that order.

17. An electro-optical device comprising:
   first and second substrates holding an electro-optical material therebetween;
   at least one light source emitting light to the first substrate; and
   a light guiding film having a plurality of slanted surfaces for deflecting light in the film towards the first substrate;
   wherein the second substrate lies opposite to the first substrate;
   wherein the first substrate has an inner polarizer layer and an inner reflective polarizer layer, formed of a wire-grid layer, formed on a surface thereof holding the electro-optical material, in that order.

* * * * *